US011421757B2

(12) United States Patent
Mariotti et al.

(10) Patent No.: US 11,421,757 B2
(45) Date of Patent: Aug. 23, 2022

(54) HIGH PERFORMANCE SYNCHRONOUS TRANSMISSION

(71) Applicant: Piaggio & C. S.P.A., Pontedera (IT)

(72) Inventors: Walter Mariotti, Pontedera (IT); Luca Nuti, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 712 days.

(21) Appl. No.: 16/465,060

(22) PCT Filed: Dec. 1, 2017

(86) PCT No.: PCT/EP2017/081170
§ 371 (c)(1),
(2) Date: May 29, 2019

(87) PCT Pub. No.: WO2018/100147
PCT Pub. Date: Jun. 7, 2018

(65) Prior Publication Data
US 2019/0383363 A1 Dec. 19, 2019

(30) Foreign Application Priority Data
Dec. 1, 2016 (IT) ........................ 102016000122071

(51) Int. Cl.
*F16H 3/093* (2006.01)
*F16H 63/18* (2006.01)
*F16H 63/30* (2006.01)
*B62M 7/06* (2006.01)
*B62M 11/06* (2006.01)
(Continued)

(52) U.S. Cl.
CPC ............... *F16H 3/093* (2013.01); *B62M 7/06* (2013.01); *B62M 11/06* (2013.01); *B62M 25/08* (2013.01);
(Continued)

(58) Field of Classification Search
CPC ........ F16H 3/093; F16H 63/18; F16H 63/304; F16H 2003/0931
(Continued)

(56) References Cited

U.S. PATENT DOCUMENTS 5,657,830 A * 8/1997 Kawashima ............. B62M 7/00
180/230
7,895,911 B2 3/2011 Hiroi et al.
(Continued)

FOREIGN PATENT DOCUMENTS

DE 1184665 12/1964
DE 19924335 12/2000
(Continued)

*Primary Examiner* — Ha Dinh Ho
(74) *Attorney, Agent, or Firm* — Stetina Brunda Garred and Brucker

(57) ABSTRACT

A synchronous transmission (1) for a motorcycle comprises a primary shaft (51) of mechanical gearbox, and a pair of secondary shafts (52, 53) equipped with one or more secondary gearwheels for transmitting the motion to a hub shaft (75), wherein a desmodromic drum (70) actuates a pair of coupling forks (67, 68) selectively defining the position of respective sliding couplings (65, 66) between primary (51) and secondary shafts (52, 53) to select all speeds of the transmission, the desmodromic drum (70) being in phase with a device (80) for actuating the gearwheels, and wherein the coupling forks (67, 68) are equipped with a cam follower end (69) maneuvered by said desmodromic drum (70) having a cylindrical surface (79) whereon a single desmodromic track (19) is formed.

22 Claims, 17 Drawing Sheets

(51) Int. Cl.
  *B62M 25/08* (2006.01)
  *F16H 7/02* (2006.01)
  *F16H 37/04* (2006.01)
  *B62M 9/02* (2006.01)

(52) U.S. Cl.
  CPC ............ *F16H 7/023* (2013.01); *F16H 37/04* (2013.01); *F16H 63/18* (2013.01); *F16H 63/304* (2013.01); *B60Y 2200/126* (2013.01); *B62M 9/02* (2013.01); *F16H 2003/0931* (2013.01); *F16H 2063/3066* (2013.01); *F16H 2200/0043* (2013.01); *F16H 2200/0052* (2013.01)

(58) Field of Classification Search
  USPC .................................................. 74/325, 331
  See application file for complete search history.

(56) References Cited

U.S. PATENT DOCUMENTS

| | | | |
|---|---|---|---|
| 7,963,183 B2 | 6/2011 | Pick et al. | |
| 8,689,658 B2 | 4/2014 | Ogasawara et al. | |
| 9,157,510 B2 * | 10/2015 | Kojima | F16H 3/093 |
| 2008/0078265 A1 * | 4/2008 | Shiozaki | F16H 63/18 74/473.12 |
| 2010/0000363 A1 * | 1/2010 | Tomoda | F16H 63/18 74/473.36 |
| 2010/0107796 A1 * | 5/2010 | Tomoda | F16H 63/18 74/473.1 |
| 2010/0251846 A1 | 10/2010 | Pick et al. | |
| 2012/0279333 A1 | 11/2012 | Yim et al. | |

FOREIGN PATENT DOCUMENTS

| | | |
|---|---|---|
| DE | 102014003241 | 9/2015 |
| EP | 1553331 | 7/2005 |
| FR | 2519698 | 7/1983 |
| FR | 2958359 | 10/2011 |
| FR | 3016848 | 7/2015 |
| GB | 2526902 | 12/2015 |
| JP | 2008106918 | 5/2008 |
| JP | 2009162278 | 7/2009 |
| JP | 2013521449 | 6/2013 |

\* cited by examiner

Schema A
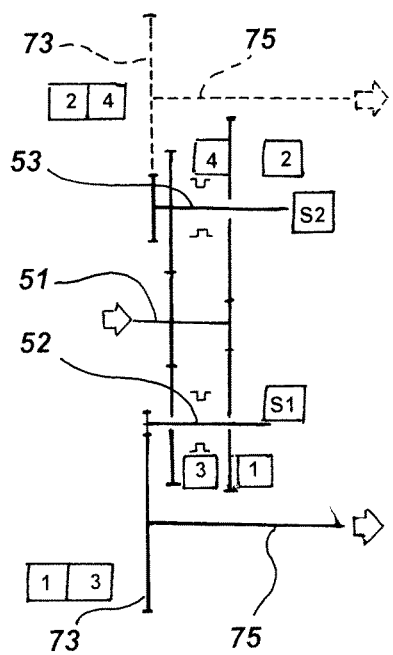
Schema B
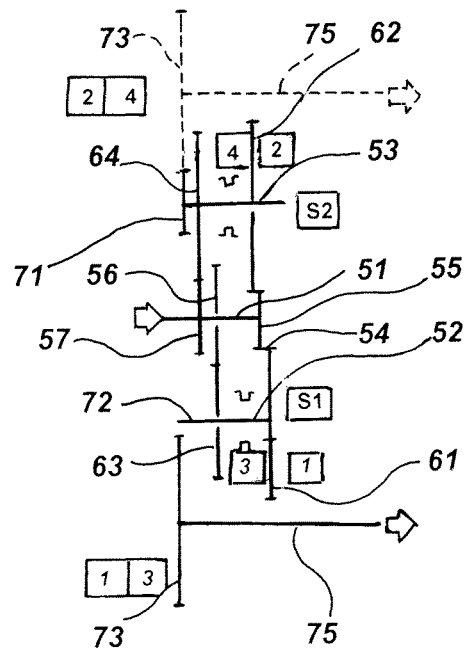
Schema C
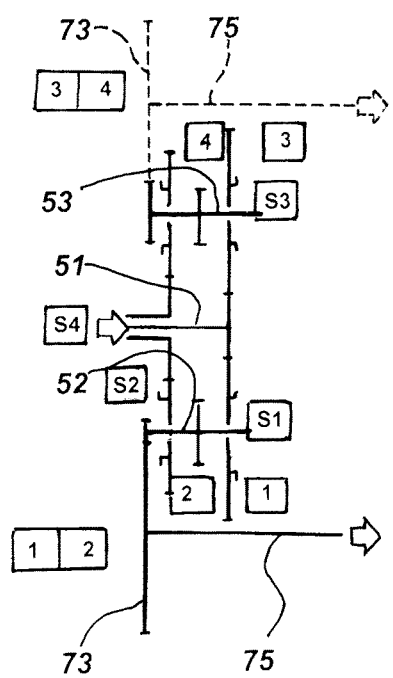
Schema D
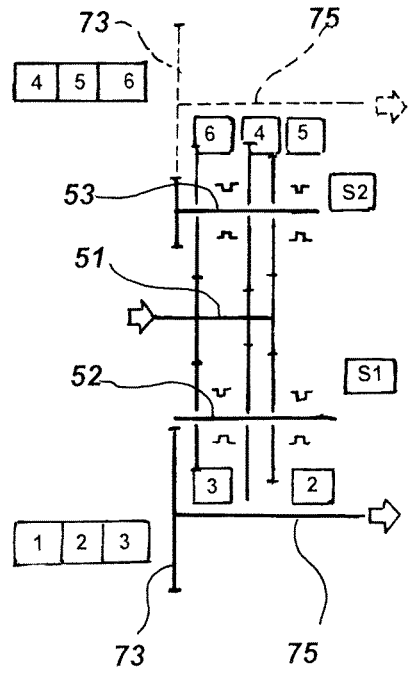
Fig.14A

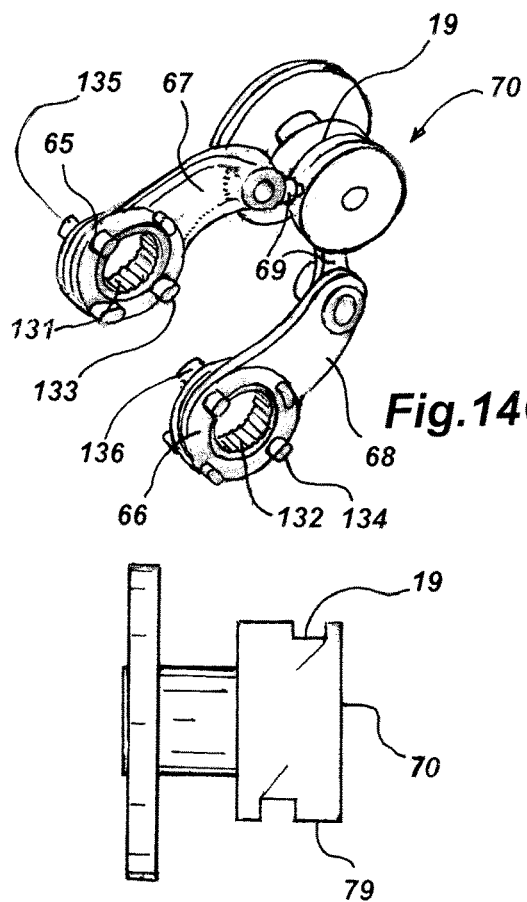
*Fig.14C*
*Fig.14D*
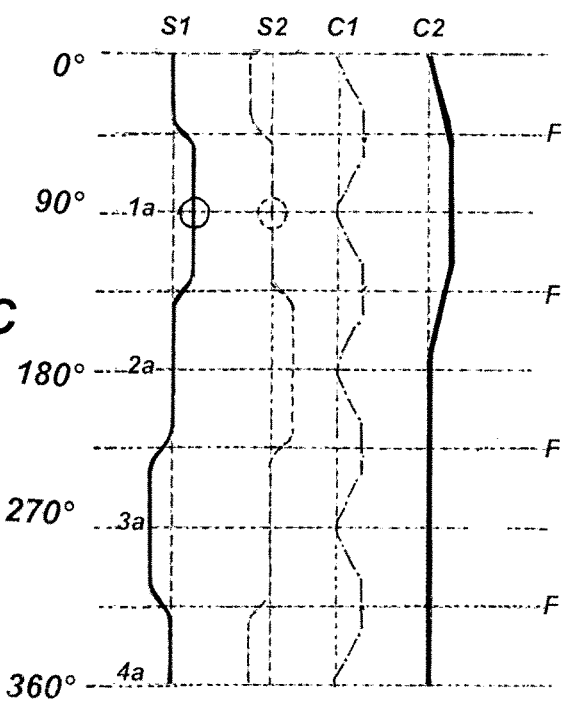
*Fig.14B*
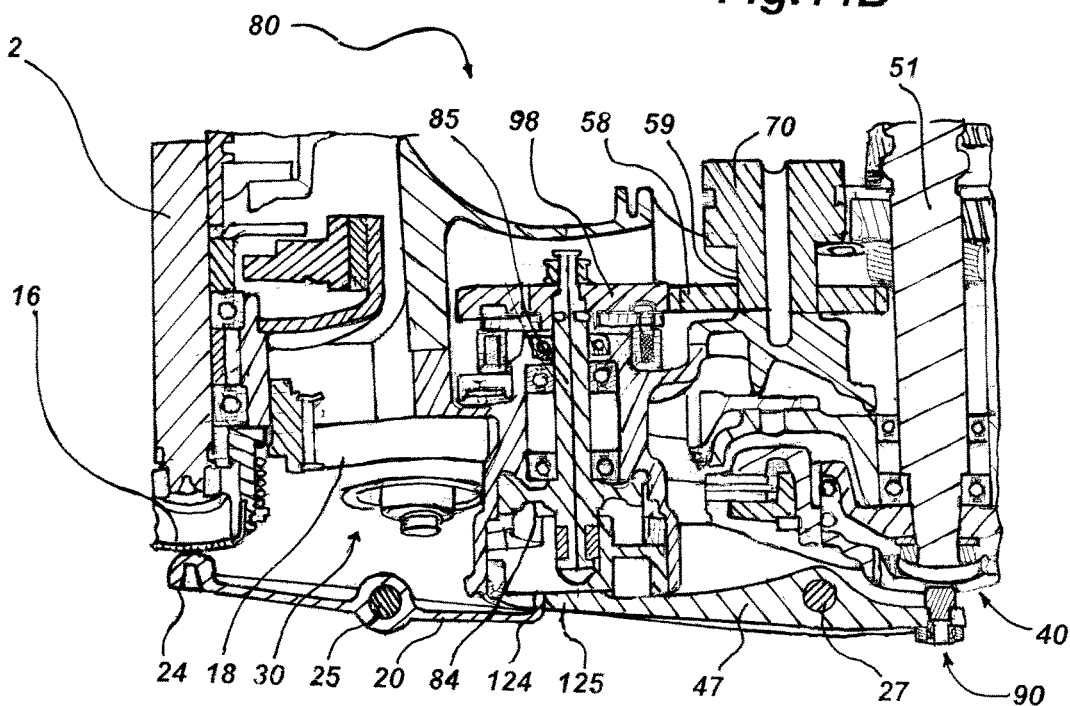
*Fig.15*

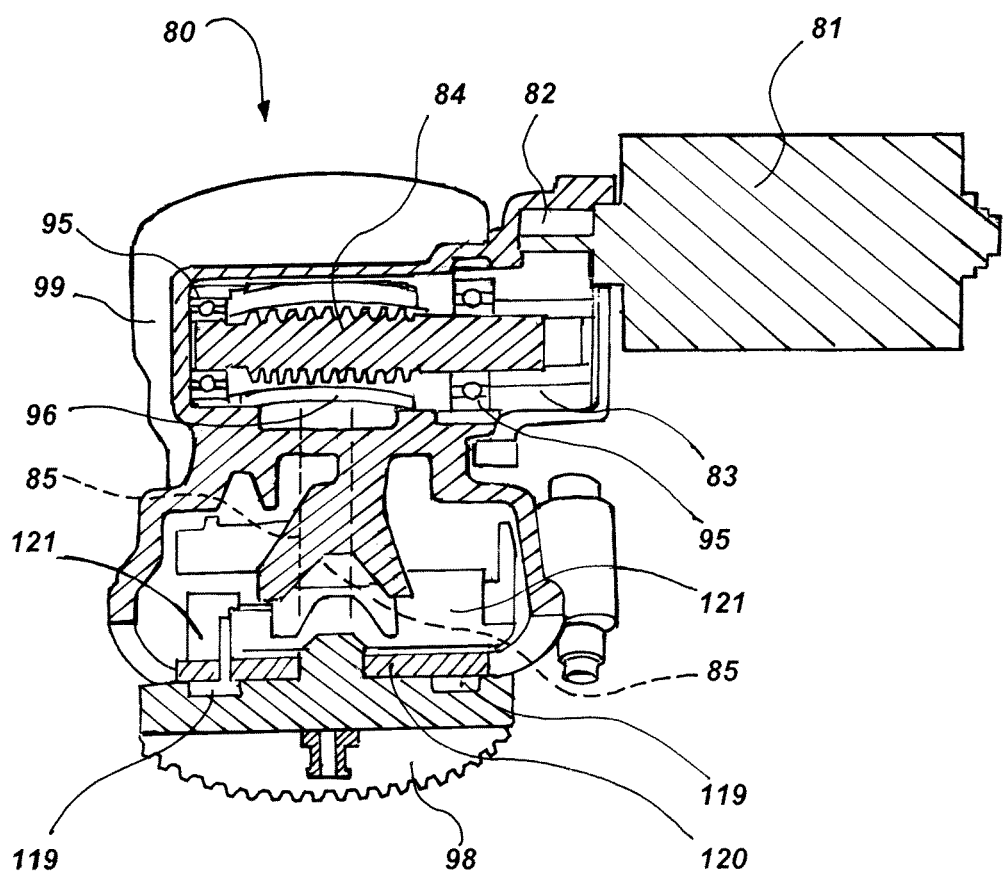
*Fig.19*
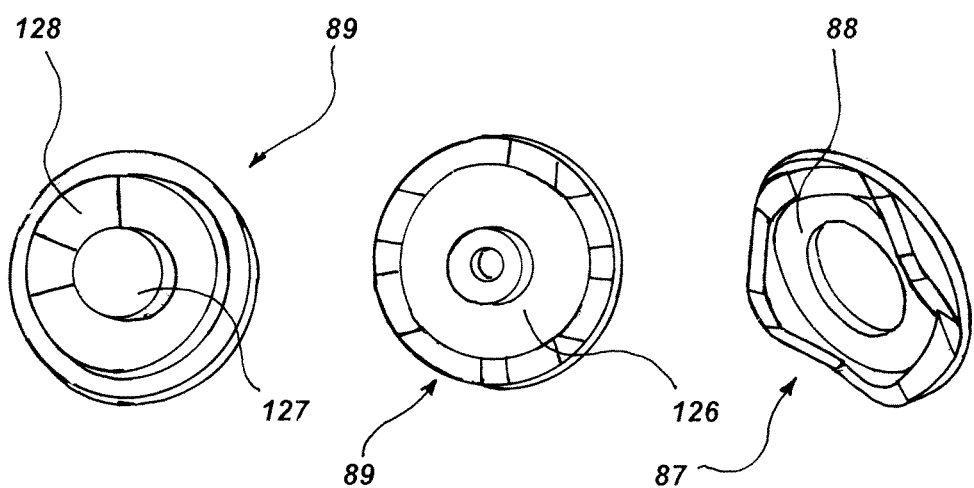
*Fig.20A*  *Fig.20B*  *Fig.20C*

HIGH PERFORMANCE SYNCHRONOUS TRANSMISSION

CROSS REFERENCE TO RELATED APPLICATION(S)

The present application claims priority to PCT International Application No. PCT/EP2017/081170 filed on Dec. 1, 2017, which application claims priority to Italian Patent Application Nos. 102016000122071 filed Dec. 1, 2016, the entirety of the disclosures of which are expressly incorporated herein by reference.

STATEMENT RE: FEDERALLY SPONSORED RESEARCH/DEVELOPMENT

Not Applicable.

DESCRIPTION

The present invention relates to a high performance transmission, in particular to be used aboard a motorcycle, such as a scooter, as element for transmitting the motion generated by a motor to a driving wheel, in particular the rear wheel of the motorcycle.

In the latest generation scooters, the most commonly used transmission is of CVT (Continuously variable transmission) type, known as continuous transmission or continuous variator.

It has the advantage of either providing a continuous traction and not requiring the manual actuation of the different ratios. However, by using elements of sliding type, such transmission is characterized by a low performance, above all in the transitory procedures when the hysteresis effect of the transmission belt is maximum.

This pushes downwards the general performance of the vehicle and increases the consumption thereof.

On the other hand, a much felt need in the field is that of limiting the consumption as much as possible, however maintaining, whenever requested by the market, the comfort level thereto the users got used by the CVT gearbox.

The object underlying the present invention is then to increase considerably the overall performance of the transmission in two-wheel vehicles for urban transport.

However, in the design of a transmission for scooters and the like, there is a base constraint which consists in that the crankshaft, which receives the motion from the piston in the cylinder, and the hub shaft, which transmits at the end of the transmission kinematic chain the motion to the rear wheel, are parallel therebetween and they are arranged at a distance depending from the engine position.

If, with a transmission of CVT type, these two shafts are substantially connected by a belt extending between two pulleys kinematically connected to such shafts by filling-in the distance therebetween, this scheme is not easy to be applied in case of a synchronous transmission, which uses a plurality of toothed wheels engaged therebetween with different transmission ratios, but with the constraint that they cannot be placed all side-by-side.

Moreover, another inherent difficulty in a synchronous transmission is the need for having an automatic gearbox, according to the operating condition of the vehicle. In fact, it is necessary to implement increasing or decreasing shifts without producing wrenches, jerks and abrupt slowing-down, with maximum running graduality and mildness.

The solution idea, to the problem of providing a transmission of the above-mentioned type, consists in optimizing the performance of the transmission itself, which could use a synchronous belt between two toothed pulleys or in case another synchronous system, for example a pinion—chain—toothed wheel system, and however a high performance system, for transmitting the motion between crankshaft and hub shaft, with fixed transmission ratio, instead of the CVT belt with variable transmission ratio, and a mechanical gearbox which, with a predefined number of ratios, replaces the ratio variations obtained by the pulleys of a CVT.

In particular, this new type of transmission has the problem of manoeuvring the couplings sliding in the mechanical gearbox with a perfect synchrony with the mechanism for actuating speeds.

Therefore, the above-mentioned problem is solved by a high performance synchronous transmission as specified above.

The main advantage of the high-performance transmission according to the present invention lies in the fact that the couplings sliding in the mechanical gearbox are perfectly synchronized with the actuation of the gearbox itself.

The present invention will be described hereinafter according to some preferred embodiments thereof, provided by way of example and not with limitative purposes by referring to the enclosed drawings, wherein:

FIG. 14A shows several schemes for actuating the transmission of FIG. 3, according to some variants thereof;

FIG. 14B shows an operation diagram describing the behaviour of some portions of the fifth detail of FIGS. 13A and 13B;

FIGS. 14C and 14D show a perspective view and a side view of a component of the fifth detail of FIGS. 13A and 13B otherwise not visible in such figures, respectively;

FIG. 15 shows a top perspective partial view and in flat longitudinal section of the transmission of FIG. 3, that is of the left side thereof;

FIG. 19 shows a third perspective section view of the sixth detail of FIG. 16;

FIGS. 20A, 20B and 20C show respective perspective views of some components of the sixth detail of FIG. 16, in particular FIGS. 20A and 20B show respective sides of the same component;

Figure 1:
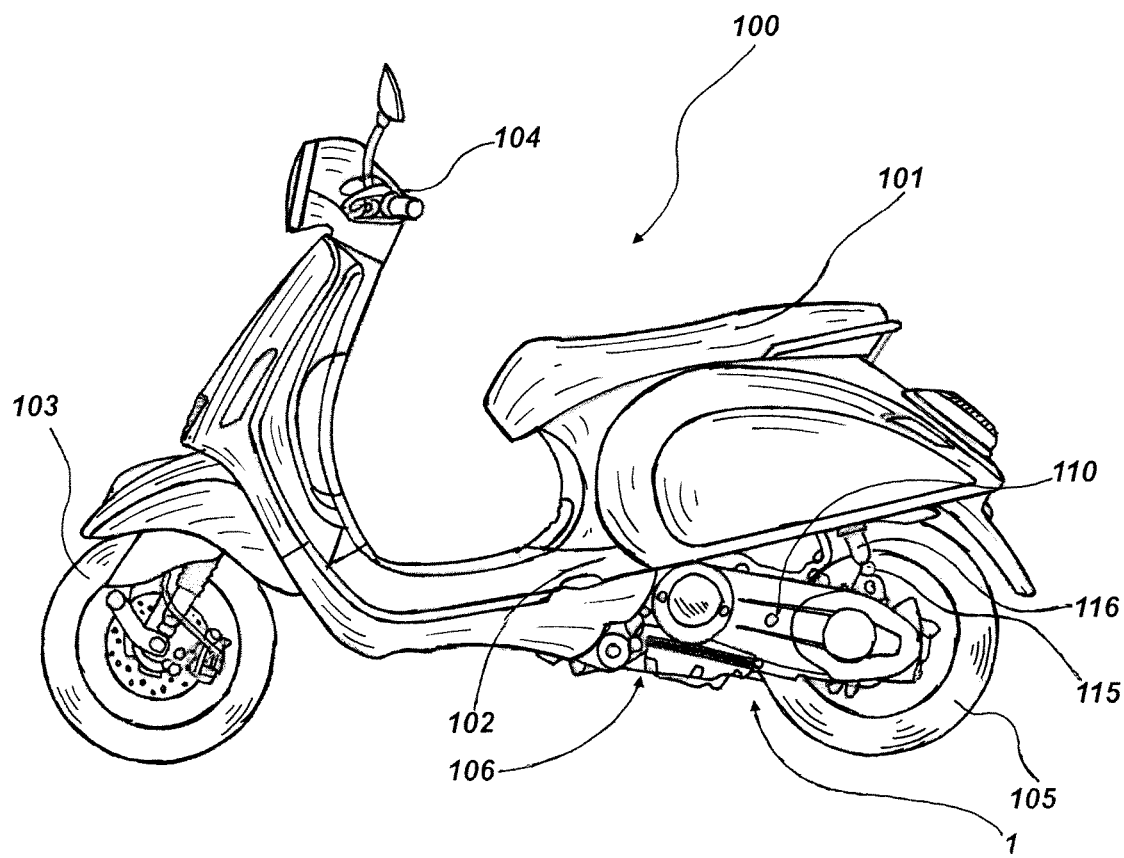
FIG. 1 shows a side elevational view of a scooter incorporating the transmission according to the present invention.
Figure 2:
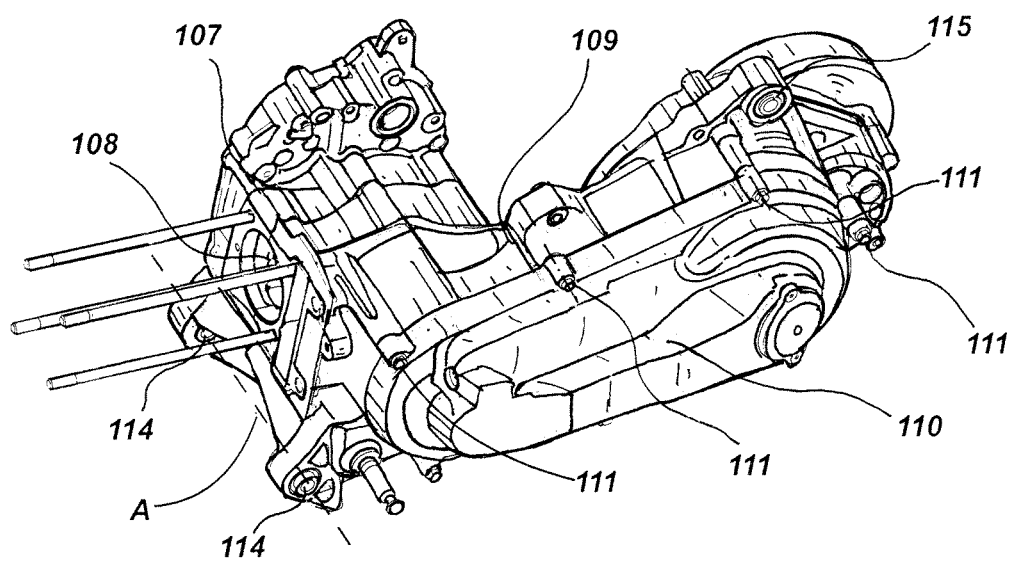
FIG. 2 shows a perspective view of the transmission of FIG. 1, closed in its container, and of the related engine block.

By referring to FIGS. 1 and 2, a motorcycle, and in particular a scooter, is designated as a whole with 100. The invention relates to the field of the vehicles with a saddle, or straddle vehicles which are driven astride, generally, with two, three or four wheels, with particular reference to the scooters having a propulsion unit arranged in a position under a saddle 101, inside a chassis 102, which herein is represented laterally, extending from a front wheel 103, controlled by handlebar 104 to a driving rear wheel 105.

The propulsion unit 106 (FIG. 2) or, briefly, the engine is of the type having one or more cylinders arranged in a position approximately tilted on the median plane of the vehicle corresponding to the rotation plane of the two wheels during the forward rectilinear running. The engine 106 has an engine block 107 in one single piece which receives, in the present embodiment, a cylinder 108 and a related (not shown) piston.

The piston acting in said cylinder 108 is connected to a crankshaft 2 positioned transversally and perpendicularly to said median plane. On a represented side (FIGS. 1 and 2) of the scooter 100 a transmission device 1 or, more briefly, a transmission of the motion from the crankshaft to the hub of the rear wheel 105 is provided.

The herein described transmission is of the synchronous or nearly synchronous type, and it uses a pair of pulleys kinematically connected by a annular belt, preferably a toothed belt on toothed pulleys or a high performance belt, for example of the Stretch Fit® type or the like.

It is to be meant that what described hereinafter can be applied wholly or partially even to an equivalent synchronous transmission of other type, for example a pinion—chain—toothed wheel transmission.

By referring to the present example, the transmission 1 has a container 109 which receives inside the transmission elements which will be described hereinafter with greater details. The container 109 is connected to the engine block 107 by creating a tunnel-like casing containing the crankshaft 2 and all transmission elements connected thereto.

Moreover, the container 109, on the exposed side of the motorcycle 100, is closed by a cover 110 of the transmission 1, substantially extending from the engine 106 to the hub shaft 75 of the driving wheel 105. The cover 110 is fastened to the container 109 by means of suitable bolts 111. Openings, slits, air intakes for accessing and/or cooling down the transmission elements through said cover 110 could be provided.

The cover 110 is rested upon a fastening edge 112 of the container 109, equipped with fastening seats 113 for said bolts 111 and additional seats of front connection 114, with a hinge connection of axis A to allow the engine block 107 and the transmission 1 to oscillate, and rear connection 115, connected to a rear suspension 116, for connecting the casing 109 and the whole transmission 1 to the frame of the vehicle 100.

Such transmission is of the several-speed type and of synchronous type 1, and it is arranged for connecting the crankshaft 2, which receives the motion from the movement of one or more pistons, to the hub shaft 75, by considering that these two shafts are parallel therebetween and placed at a prefixed distance. The hub shaft 75, at one distal end thereof, is equipped with a pinion 76 connecting to the rear wheel 105.

They are both perpendicular to the median plane of the vehicle, defined by the rotation plane of the front and rear wheels. It is further to be meant that the use of this type of transmission is not limited to the herein represented two-wheel scooter, but it can be extended to a scooter with a pair of front wheels or to a scooter with four wheels.

Figure 3:
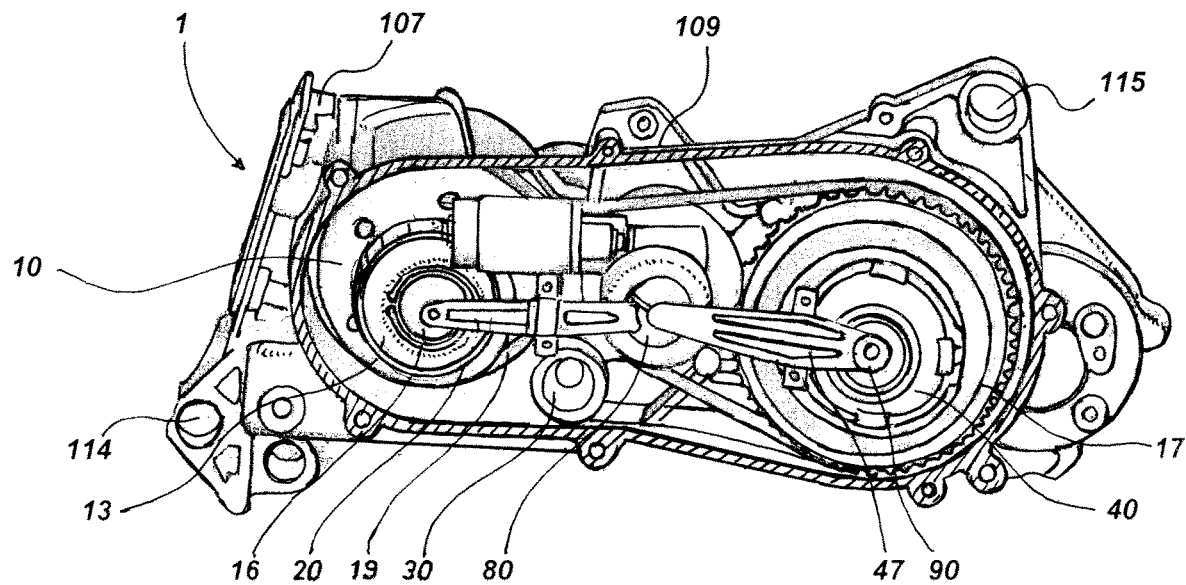
FIG. 3 shows a front view of a first embodiment of high performance synchronous transmission according to the present invention, without outer casing.
Figure 24:
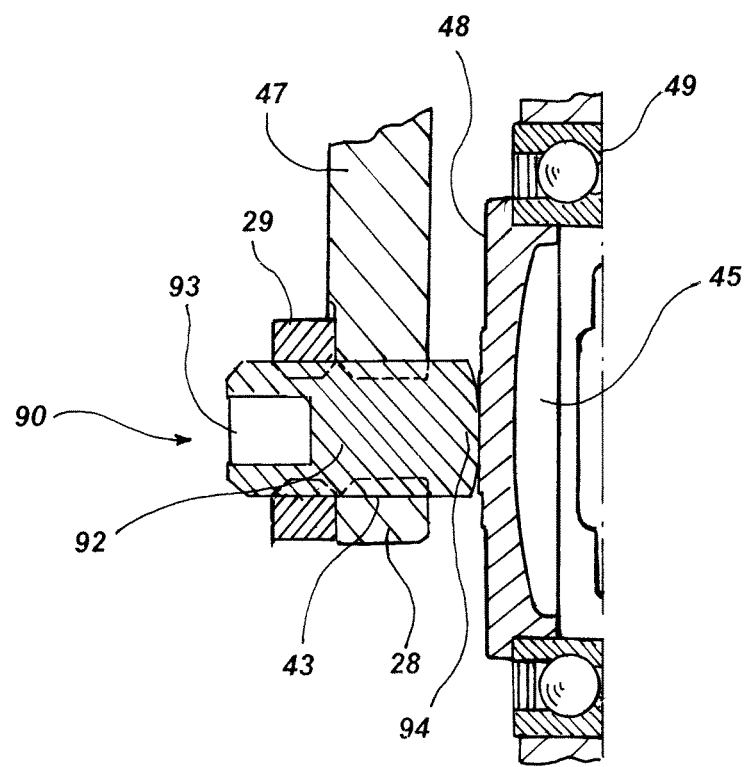
FIG. 24 shows a section section of the seventh detail of FIG. 20.

By referring to FIG. 3 and to the subsequent figures to FIG. 24, a first embodiment of the transmission according to the invention is herein designated as a whole with 1 and it comprises a crankshaft 2 comprising a crank 3 thereto a connecting rod 4 is connected which receives the motion by a not represented piston; however, it is to be meant that such transmission could be applied even to several-cylinder engines.

The crankshaft 2 extends from both sides of the crank: in the direction opposite to the transmission the crankshaft will be connected, by way of example, to an electric engine-generator, in case but not exclusively for an operation of hybrid type, and to a cooling valve. In the direction of the transmission, the crankshaft comprises a starting centrifugal clutch 5, which is useful to manage the starting of the vehicle from standstill.

Figure 8:
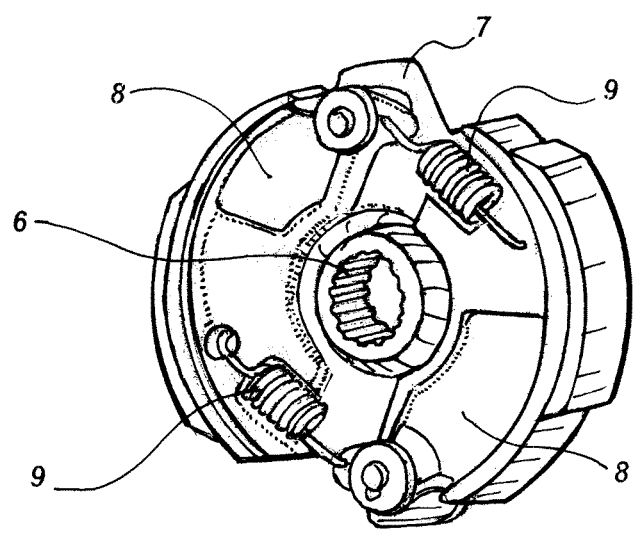
FIG. 8 shows a perspective view of a second detail of the transmission of FIG. 3.

In fact, the rotation of the crankshaft 2 puts in rotation the small hub 6 of the shaft and the mass-bearing plate 7 connected thereto, which drugs into rotation two clutch masses 8 (FIG. 8) which tend to move away therefrom due to the effect of the centrifugal force acting thereon, in opposition to clutch springs 9.

Once reached the defined rotation regime, the masses 8, through the friction material placed on the outer periphery thereof, transmit the motion to a first clutch housing 10, which is stiffly keyed on a bushing 11 assembled on clutch bearings 12 in order to guarantee the rotation between crankshaft 2 and housing 10 when the clutch is in the idle position.

Moreover, a driving pulley 13 is arranged on the bushing 11, this pulley surrounding the distal end thereof and which is stiffly keyed thereto. The driving pulley 13 (FIG. 7) has a mobile coupling element 14, shaped like a crown and inserted inside thereof, that is between the pulley 13 and the bushing 11, and capable of sliding with respect to the distal end of the shaft 2 thereabout it is slidingly put, so as to be free to translate in opposition to a pre-loaded spring 15 arranged between the driving pulley 13 and the distal end of the mobile crown 14. On the distal end of the crankshaft 2 a fixed coupling element 77 is instead provided, integral thereto, with respect thereto said mobile coupling element 14 slides.

The two mobile and fixed coupling elements, which can be slidingly and axially controlled to engage and disengage, so as to connect directly the driving pulley 13 to the crankshaft 2 by excluding the centrifugal clutch 5, constitute a coupling between the crankshaft 2 and the driving pulley, with the function of excluding the centrifugal clutch of the present transmission.

Figure 9:
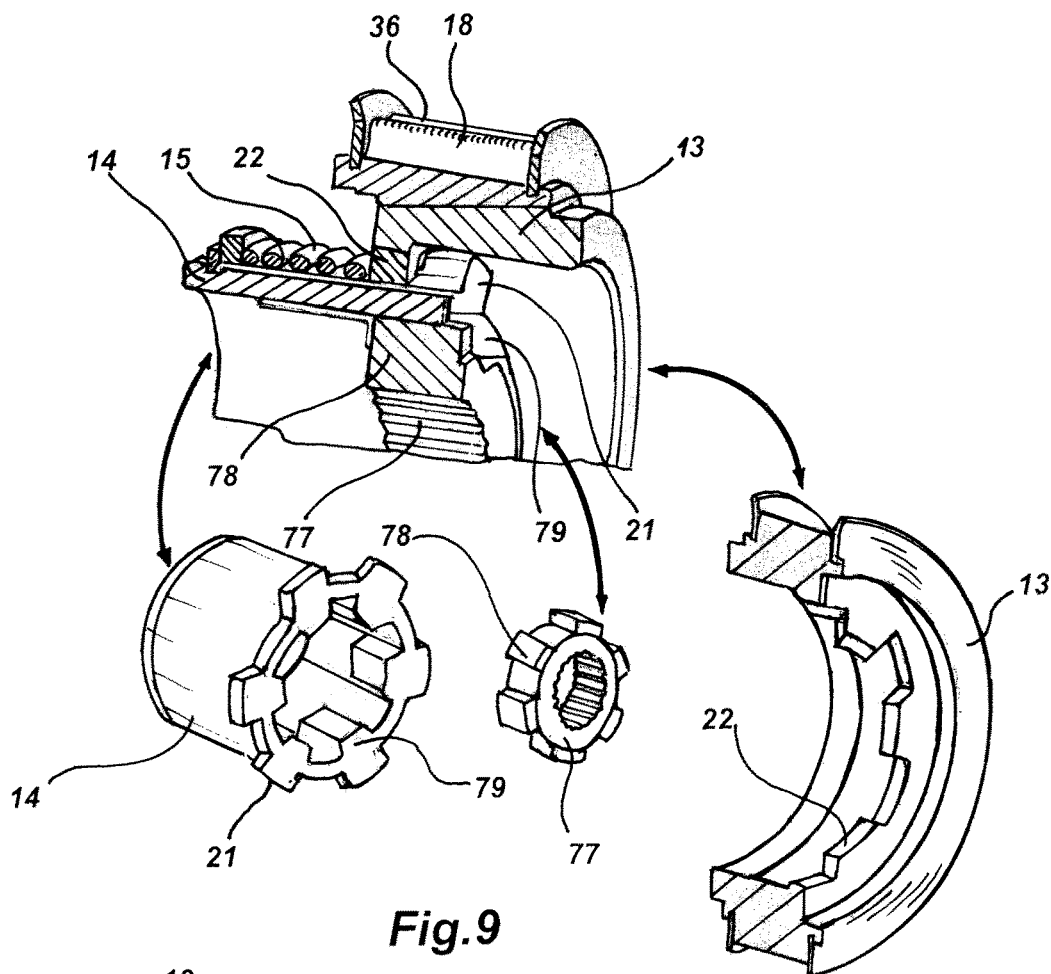
FIG. 9 shows a perspective view of some components of the first detail of FIG. 7.

The fixed coupling element 77 has a first axial toothing 78 projecting outwardly and radially; the mobile coupling element 14 has both a second axial toothing 79 projecting inside thereof and radially, and it is intended for coupling with said first axial toothing 77, and a third axial toothing 21 projecting outwardly and radially (FIG. 9).

Under axial toothing a toothing is meant whose teeth extend according to an axial direction on the belonging element, arranged for coupling by sliding in an axial direction with the teeth of a complementary axial toothing.

The driving pulley 13, in turn, has a fourth axial toothing 22 which is intended to couple with said third axial toothing 21 of the mobile coupling element 14. It has a cup shaped element 16, rested on a peripheral edge thereof and so as to project outside the driving pulley 13, coaxial thereto, and capable of pushing, if forced in this direction, on the mobile coupling element 14 thus by making the second axial toothing 79 and the third axial toothing 21 to slide with respect to the first axial toothing 78 and to the fourth axial toothing 22, respectively.

The cup shaped element 16 acts as first actuation button 16 or engagement button.

The configuration is so that, when a pressure is not exerted on the first actuation button 16, the mobile coupling element 14 translates coaxially to the crankshaft 2 by moving away from the bushing 11, pushed by the force of the preloaded spring 15. Such translation determines the coupling of the first toothing 78 of the fixed coupling element 77, integral to the crankshaft 2, and of the second toothing 79 of the mobile coupling element 14, whereas the third axial toothing 21 of the mobile coupling element 14 and the fourth axial toothing 22 of the driving pulley 13 are always engaged therebetween, but they allow to the mobile coupling element 14 to slide with respect to the driving pulley 13 by implementing a prismatic coupling.

Therefore, by leaving free the first actuation button 16 a direct mechanical connection between the crankshaft 2, the fixed coupling element 77, the mobile coupling element 14 (due to the first and the second axial toothing 78, 79) and the driving pulley 13 (due to the third and the fourth toothing 21, 22) is determined and, under such operating condition, the driving pulley 13 is dragged into rotation by the crankshaft 2 whatever the rotation regime of the latter may be, that is whatever the operating state of the centrifugal clutch 5 may be.

In this operating state, even the bushing 11 is dragged into rotation by the driving pulley 13, even if it does not receive the motion by the centrifugal clutch 5: it can rotate freely on the bearings 12 even if the rotation regime thereof to say the truth is equal to that of the crankshaft 2, but wrenches in the transition phase are avoided. On the contrary, if the centrifugal clutch 5 is engaged, the rotation regime thereof is equal to that of the crankshaft 2 and of the driving pulley 13.

This operating state, as it will clearly appear here below in the present description, corresponds to the second, third and fourth speed, that is to any higher speed than the first speed, wherein one wishes that the driving pulley 13 transmits the motion to the driving wheel 105, regardless the rotation regime of the crankshaft 2, then even below the threshold which would determine the disengagement of the centrifugal clutch 5.

On the contrary, if the first actuation button 16 is pressed, the mobile coupling element 14 is pushed in the direction of the bushing 11 in opposition to the action of the preloaded spring 15, by disengaging the first and the second axial toothing 78, 79 and then by disengaging the driving pulley 13 from the crankshaft 2. In this state, the mobile coupling element 14 can receive and transmit the motion given to it by the bushing 11 through the centrifugal clutch 5. In fact, the bushing 11 is released from the crankshaft 2 thanks to the bearings 12.

This state corresponds to the first speed or the idle state, the centrifugal clutch 5 determining the passage from one to the other one and viceversa depending upon the rotation regime of the crankshaft 2.

Therefore, by summing up, in the first speed the centrifugal clutch operates normally, by allowing the motion transmission and the starting of the motorcycle 100 above a predetermined rotation regime of the crankshaft 2, wherein the centrifugal clutch 5 causes its own engagement.

In the second speed, and in the subsequent speeds the centrifugal clutch 5 actually is excluded from the kinematic chain, as the motion is transmitted by the crankshaft 2 directly to the driving pulley 13, regardless the rotation regime of the crankshaft 2, therefore even below said threshold wherein the centrifugal clutch 5 is not engaged.

Figure 7:
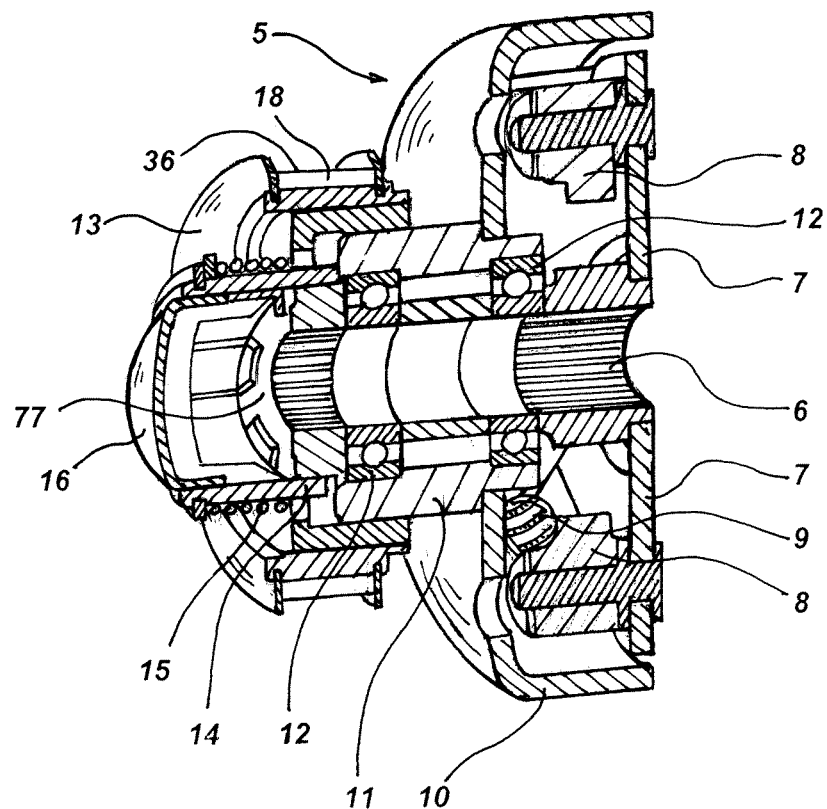
FIG. 7 shows a perspective section view of a first detail of the transmission of FIG. 3.

FIG. 7 represents this second state, with a gap between distal end of the bushing 11 and proximal end of the mobile coupling element 14.

The driving pulley 13 instead is useful to transmit the motion from the crankshaft 2 to the axis of a driven pulley 17 which constitutes the input of the real gearbox.

Figure 10A:
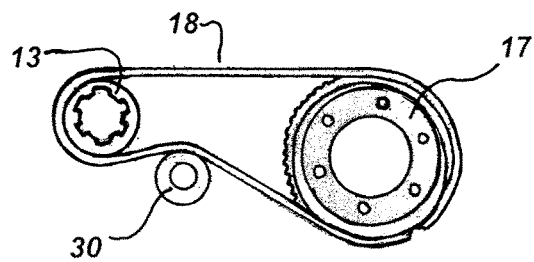
FIG. 10A shows a connecting scheme to combine the details of the previous figures.
Figure 10:
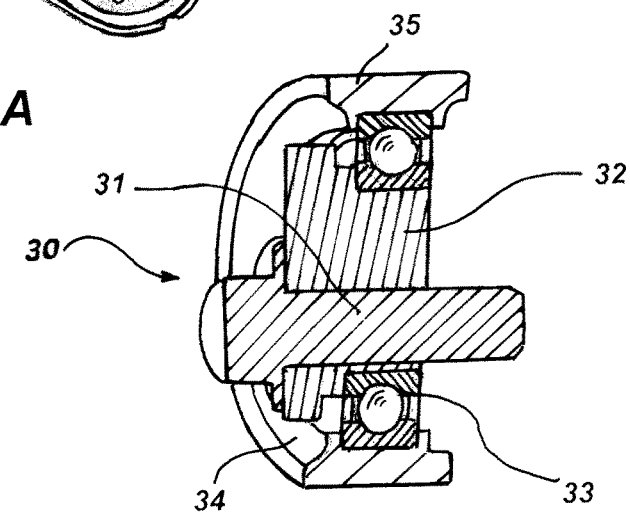
FIG. 10 shows a front and perspective view in partial section of a third detail of the transmission of FIG. 3.

The two driving 13 and driven 17 pulleys are toothed and they are connected by a synchronous belt 18 with a fixed transmission ratio. The side containments of the belt 18 are mounted on this driving pulley 13 in order to optimize the transmission performance (FIG. 10).

To this regard, a control lever 20 is provided to exert a pressure on the first actuation button 16, that is on the engagement button.

Therefore, upon starting in the first speed, the control lever 20 is active, it pushes on the first actuation button 16 and thus on the crown-like mobile coupling element 14, so as to disengage between them the first and the second toothing 78, 79.

From the second speed on, the lever 20 moves away from the first actuation button 16 and it does not exert any pressure, in a not intervening position.

This implements the possibility of running at lower engine rotation regimes than those upon connecting the clutch 5, an impossible procedure on all systems with automatic centrifugal clutch, including CVT systems.

Figure 4:
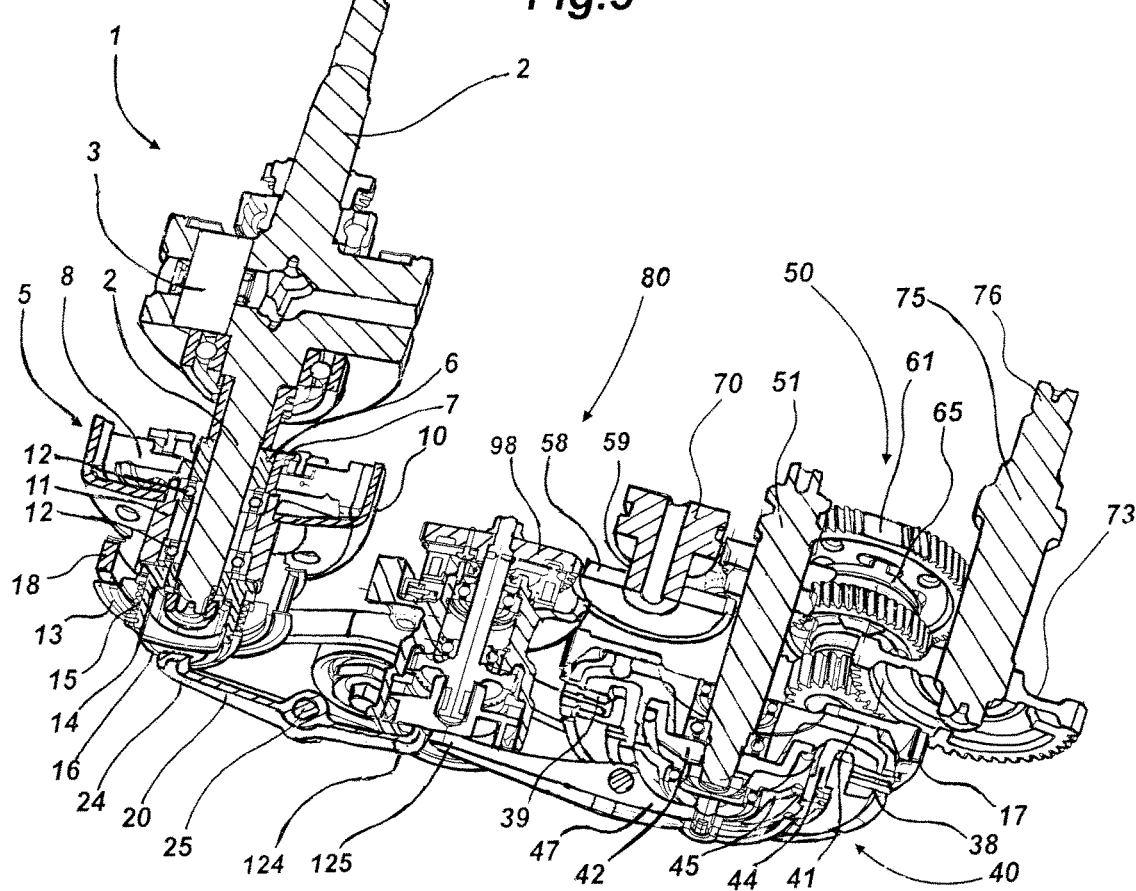
FIG. 4 shows a perspective top view and a view in flat longitudinal section of the transmission of FIG. 3.
Figure 5:
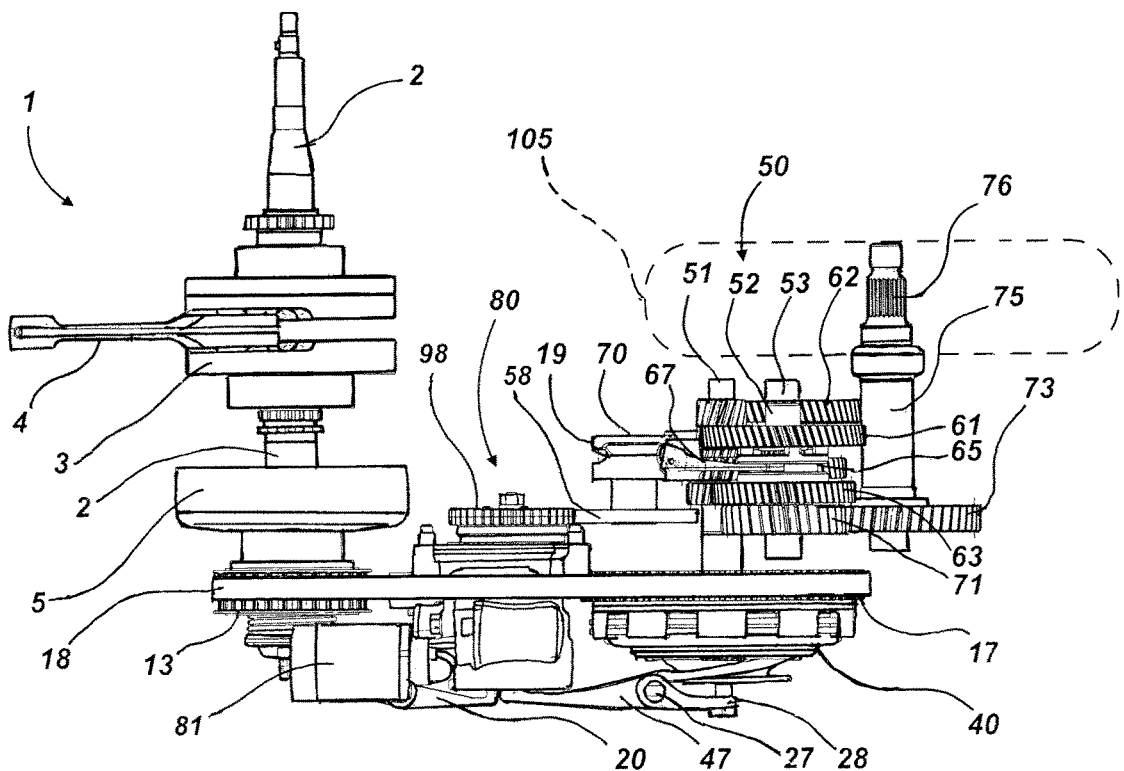
FIG. 5 shows a top plan view of the transmission of FIG. 3.
Figure 6:
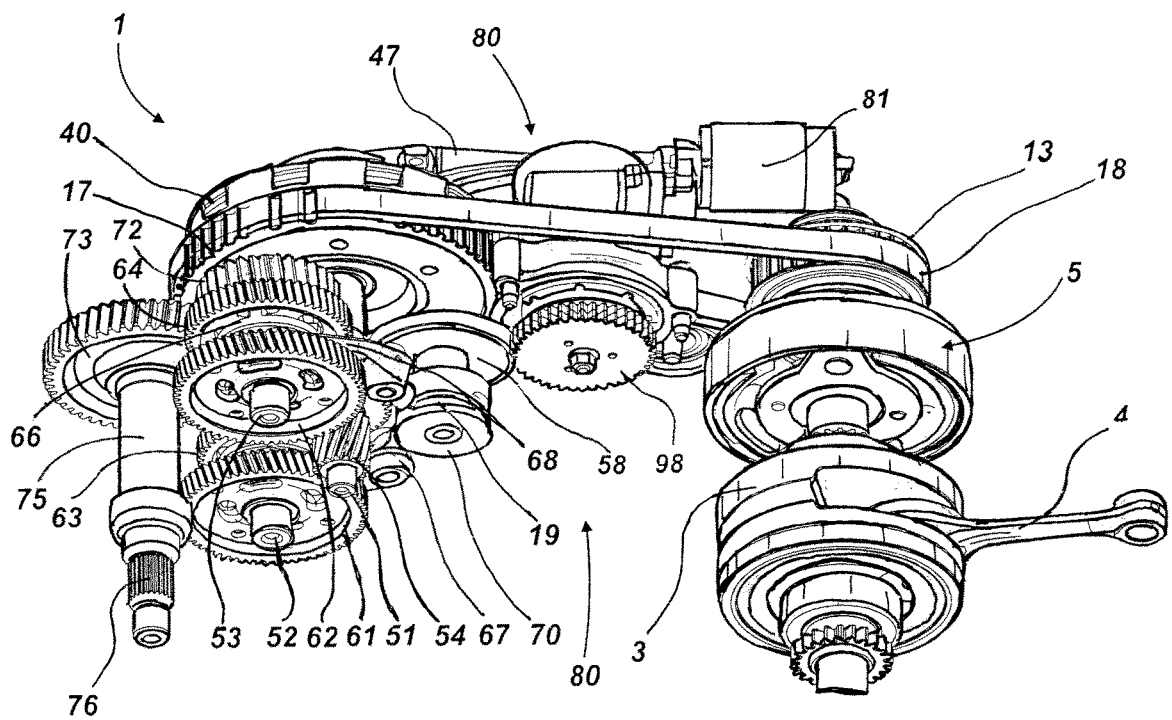
FIG. 6 shows a rear perspective view of the transmission of FIG. 3.

The lever 20, on this regard, has a pressing end 24 and it is oscillating with respect to a fulcrum 25 integral to a fixed portion of the transmission, thus to the container 109 (FIG. 4). The way in which the control lever 20 is actuated will be described hereinafter.

As previously explained, the annular belt 18 which is wound on the driving pulley 13 implements a synchronous connection, as it is toothed, and it requires the presence of a fixed tensioner 30, arranged in the lower branch of the belt 18 (FIG. 10A), arranged outside the ring formed by the belt 18 and pressing towards the inside of the ring itself.

This belt 18 is required for transmitting the motion from the axis of the crankshaft 2 to the axis of the gearbox input, placed in the area of the rear wheel 105.

The transmission ratio is fixed and the tensioner 30 has to keep a constant load under all use conditions.

As already highlighted, it is to be noted that it is not strictly necessary that the belt 18 has to be toothed, as there are so-called high transmission performance belts, that is substantially synchronous or almost synchronous, with or without tensioning device 30.

The latter (FIG. 10) has an eccentricity in the central fastening thereof: the tensioning device 30 has a fixed pin 31, integral to a fixed portion of the transmission, whereon a circular and eccentric supporting element 32 is assembled, which forms a circular periphery whereon a tensioner bearing 33 is assembled, whereon, in turn, a pressing wheel 34 is assembled, positioned so as to exert a pressure between the smooth outer periphery thereof 35 on the tooth outer face 36 of the belt 18.

The fixed pin 31 is arranged eccentric with respect to the supporting element 32, so that, by rotating the latter during assembly, it is possible to move the wheel 34 by loading the belt 18.

The fixed pin 31 is of the screw type and, once tightened, it locks the supporting element 32 in the wished operating position thereof.

If released, the fixed pin 31 allows again the rotation of the supporting element 32 thus by moving away the pressing wheel 34 from the belt 18, by making easy, for example, the replacement thereof at the end of its life cycle. Then, it is sufficient to reposition the eccentric supporting element 32 in the maximum tensioning position thereof.

Figure 11:
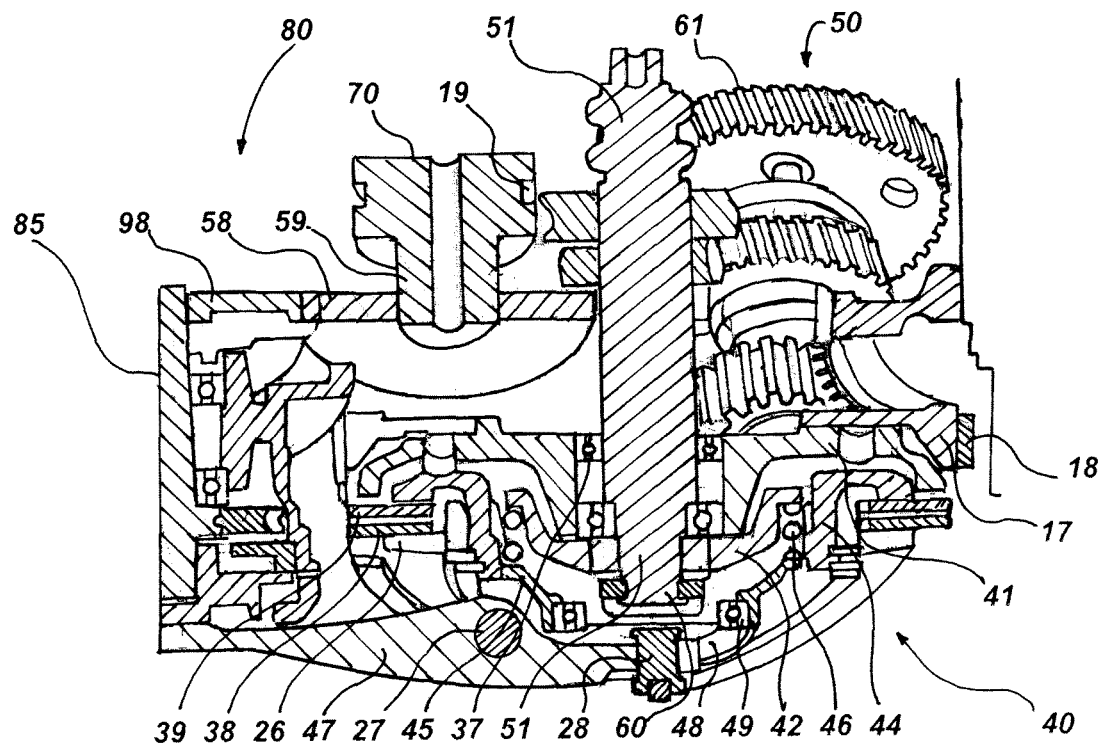
FIG. 11 shows a top perspective partial view and a flat longitudinal section view of the transmission of FIG. 3, that is of the right side thereof.
Figure 12:
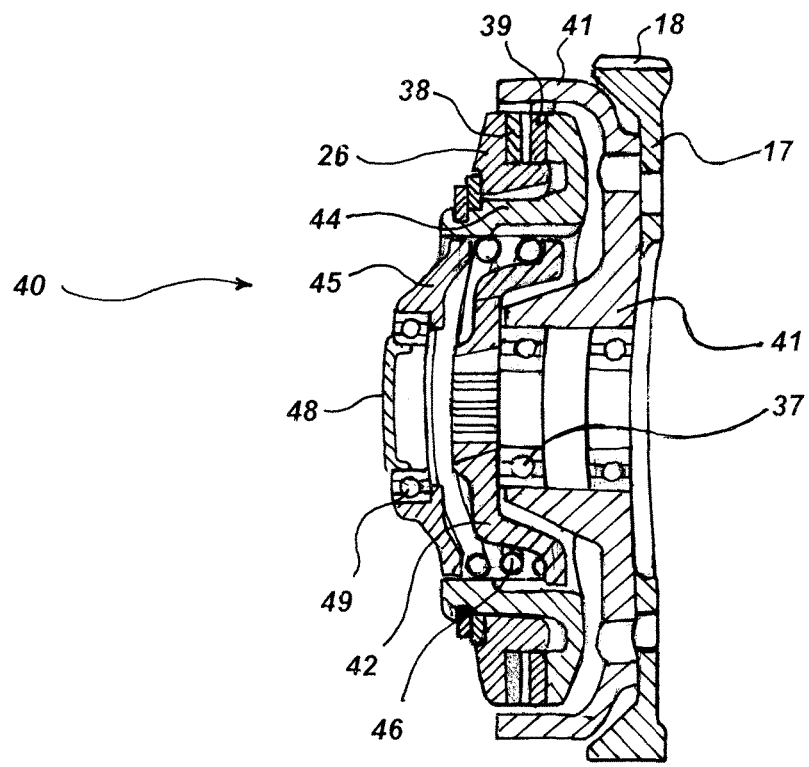
FIG. 12 shows a perspective section view of a fourth detail of the transmission of FIG. 3.

The driven pulley 17 is a toothed pulley too, or of other type depending upon the selected belt. It transmits the motion from the belt 18 to an input clutch 40 (FIGS. 11 and 12) which performs materially the speed shifts.

The input clutch 40 is a clutch of the disc type and it comprises a second clutch housing 41 connected to the driven pulley 17. The input clutch 40 transmits the motion to a primary shaft of the gearbox 51 the distal end thereof, facing towards the cover 110 of the transmission 1, is connected to a clutch hub 42.

The second clutch housing 41, too, is assembled on the primary shaft of the gearbox 51 by means of a pair of first clutch bearings 37, thanks thereto the rotation of the shaft 51 does not affect the clutch housing and vice versa.

Inside the housing 41 two clutch discs of the input clutch 40 are included: a more external first clutch disc 38 is connected to the housing 41, whereas a second clutch disc 39 is faced thereto more internally. It is connected and integral to an inner disc-pushing element 44, which surrounds and includes the clutch hub 42 thereto it is connected.

The inner disc-pushing element acts axially on the clutch discs 38, 39 by opening and closing them.

A clutch cover 26 is connected to the first clutch disc 38, which cover encloses the space included in the second clutch housing 41 and supports the disc-pushing elements which will be described hereinafter.

To this regard, a clutch spring 46 is positioned between the clutch hub 42 and an inner disc-pushing element 45 covering and towering above the clutch hub 42. At the distal end of the primary shaft 51, thus at the rotation centre thereof, the outer disc-pushing element 45 comprises a second actuation button 48 assembled on a second clutch bearing 49 which releases it from the rotation of the outer disc-pushing element 45.

Onto the second actuation button 48 a pressure can be exerted which determines the detachment of the input clutch 40.

The clutch discs 38, 39, usually, are closed due to the effect of the load of the clutch spring 46. The motion is then transmitted by the driven pulley 17 to the housing 41 and to the discs 38, 39, and therefrom to the two disc-pushing elements 44, 45 and to the clutch hub, and then to the primary shaft 51.

When a pressure is exerted on the second actuation button 48, this pushes towards the distal end of the primary shaft 51 the outer disc-pushing element 45: through the inner disc-pushing element the second clutch disc 39 is moved away from the first clutch disc 38, thus by interrupting the kinematic continuity between second clutch housing 41 and clutch hub 42.

The pressure on the actuating button is obtained by means of a clutch lever 47 the clutch fulcrum 27 thereof is connected to a fixed portion of the transmission 1, that is to the container 109 or to the transmission cover 110, analogously to what described for the control lever 20.

The clutch lever 47 exerts a pressure through a pressing operating end 28, pressure which opposes to the load of the clutch spring 46 which defines the dragging load of the clutch 40.

The actuation of the clutch lever 47 will be described in greater detail here below in the present description.

Figure 23:
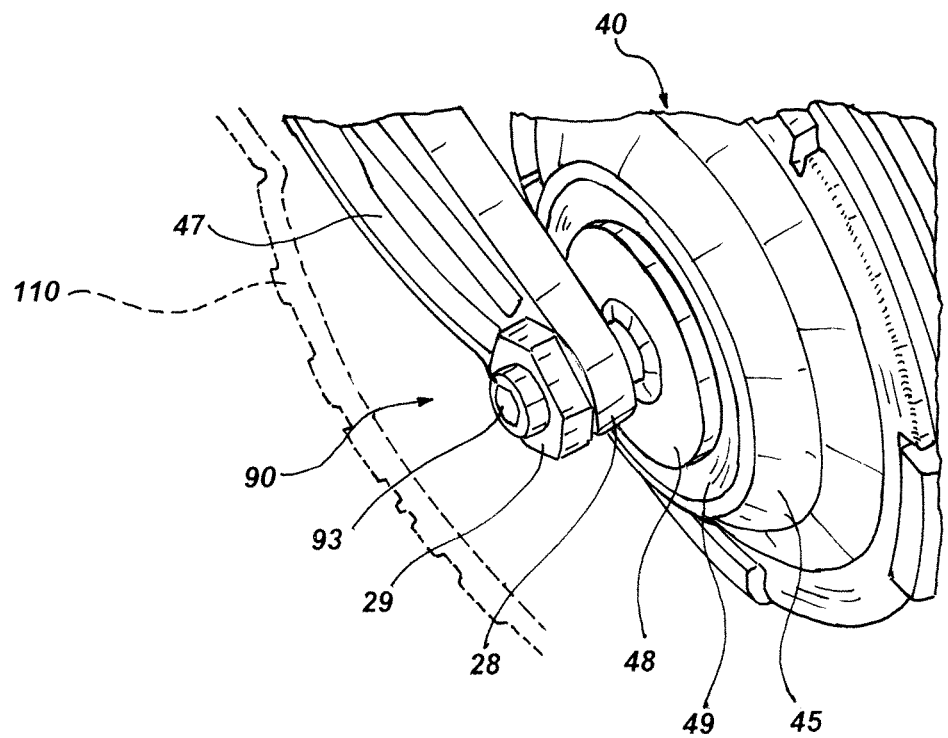
FIG. 23 shows a perspective view of a seventh detail of the transmission of FIG. 3.

By referring to FIGS. 23 and 24, on the input clutch 40, between it and the clutch lever 47, an adjustment of the clearance between the pressing operating end thereof 28 and the second actuation button 48 connected to the outer disc-pushing element 45 is provided.

Such adjustment is obtained by means of a clearance-adjusting element 90 which allows to adjust an assembly clearance defined and in case adjustable in time for maintenance. Such adjustment allows to set to zero the assembly clearances, due to the tolerances and in time the possible wears which could modify the timing between actuator and clutch itself. Once adjusted this intervention point, it follows that the actions of the device actuating the gearwheels, which will be described hereinafter, will be always synchronized and phased in the same way and with the margins provided by the tolerance on the actuation clearance.

The clearance-adjusting element 90 provides a locking nut 29, assembled on said operating end 28 at a threaded hole 43, which is useful to assemble an adjusting screw 92 inserted in said nut 29 and in said hole 43.

The axial position of the adjusting screw 92 can be manoeuvred simply by acting, with a suitable wrench, on its head 93, so as to adjust the incidence of the operating end 28 by regulating the wished clearance.

In fact, by variating the axial position of the adjusting screw 92 the resting terminal thereof 94, interfering with the second actuation button 48 assembled on the second clutch bearing 49 (FIG. 24), is translated.

The input clutch 40 is arranged for driving a mechanical gearwheel transmission 50, the number of ratios thereof is not constraining. In the scheme which will be described hereinafter four ratios are provided.

The used gearbox scheme provides a primary axis and two secondary axes, and a final hub shaft, that is the wheel axis. This scheme can be the most suitable one for the type applying to a scooter, due to compactness in axial direction and versatility in managing ratios. The gearbox 50 then comprises: a primary shaft 51, already mentioned with reference to the input clutch 40 which transmits to it the motion, with an input gearwheel 60 which is connected to the clutch hub 42; a first secondary shaft 52 which is assigned to the first and third speed by means of a first running toothed wheel 61 and a third running toothed wheel 63 with different diameters, with a respective first output gearwheel 71 for engaging with the hub shaft 75 connected to the rear driving wheel 105; a second secondary shaft 53, intended to the second and fourth speed with a second running toothed wheel 62 and a fourth running toothed wheel 64, with output gearwheel 72 for engaging with the hub shaft 75 connected to the rear driving wheel 105; and at last the already mentioned hub shaft 75 which supports an output toothed wheel 73 with big diameter, so as to implement an additional reduction in the transmission ratio at the hub shaft 75.

Figure 13A:
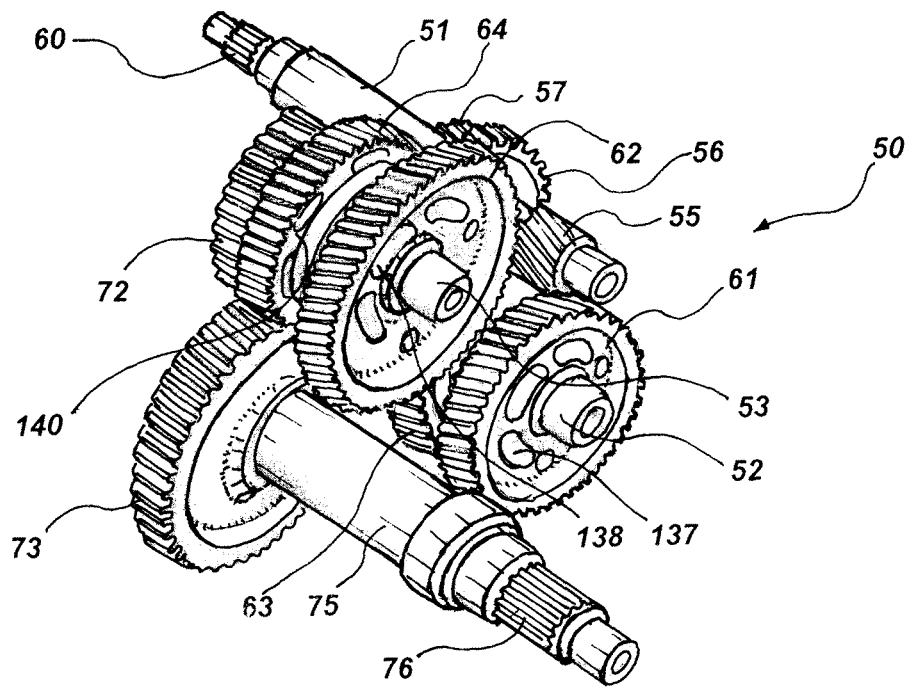
FIGS. 13A and 13B show a perspective view and another perspective view in partial section of a fifth detail of the transmission of FIG. 3, respectively.
Figure 13B:
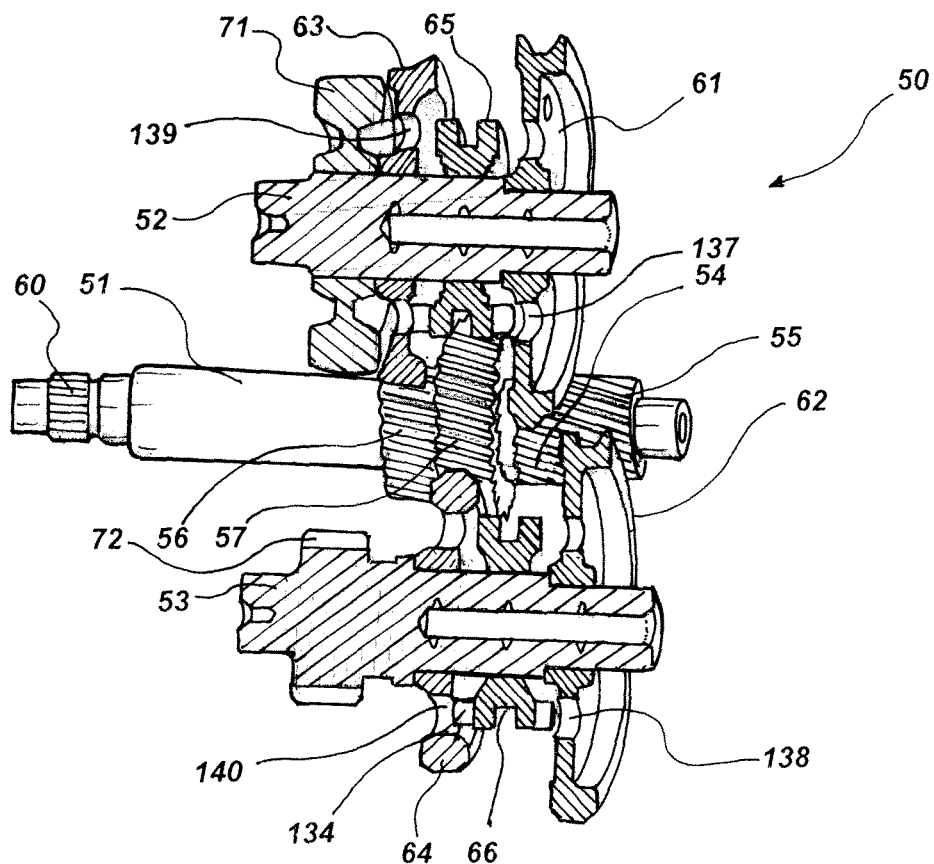
Figure 16:
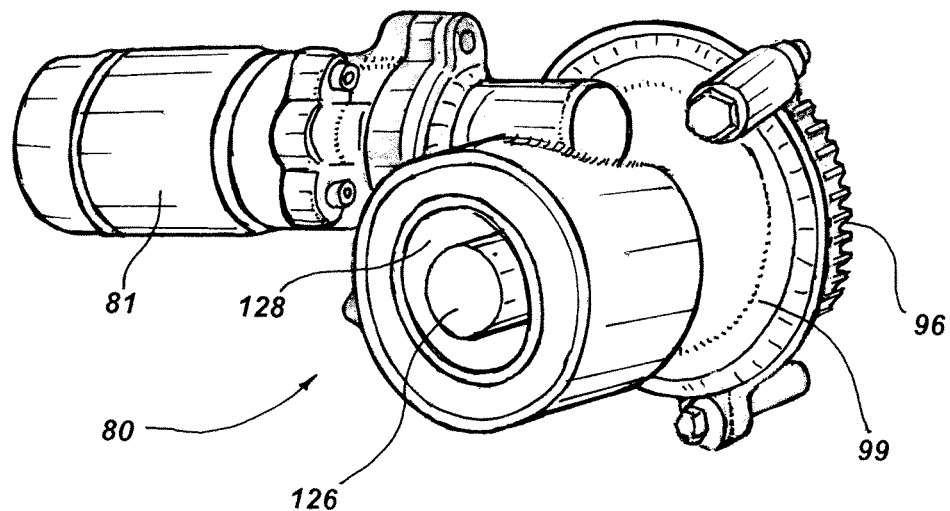
FIG. 16 shows a perspective view of a sixth detail of the transmission of FIG. 3.
Figure 17:
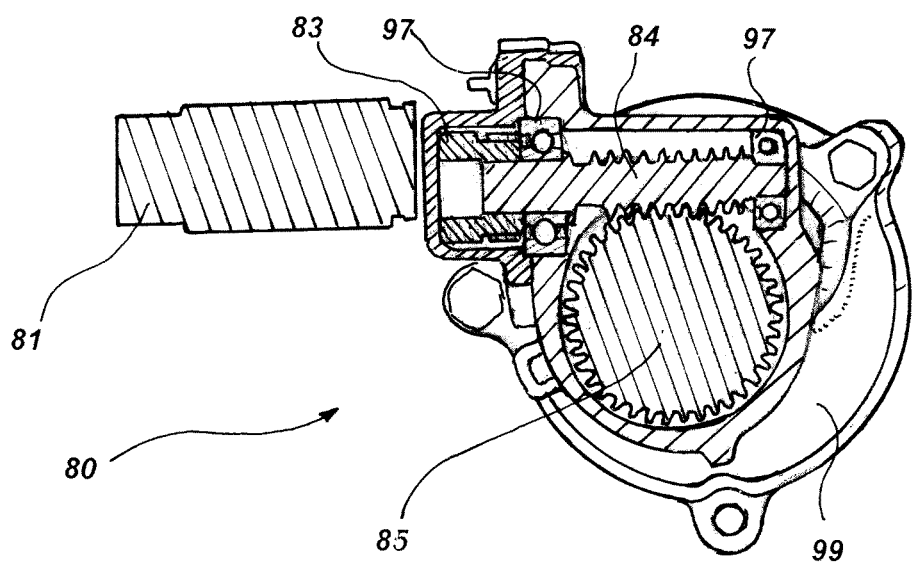
FIG. 17 shows a first perspective section view of the sixth detail of FIG. 16.

The above-mentioned toothed wheels 61, 62, 63 and 64 of the first, second, third and fourth speed, respectively, are assembled freely on the respective secondary shaft 52, 53 so that they can rotate with respect thereto, by remaining in a fixed and predetermined axial position, and they are respectively engaged with a first running pinion 54, a second running pinion 55, a third running pinion 56 and a fourth running pinion 57 arranged fixed and integral to the primary shaft 51, for transmitting the first speed (first toothed wheel 61 of the first secondary shaft 52 and first pinion 54 of the primary shaft 51), of the second speed (second toothed wheel 62 of the second secondary shaft 53 and second pinion 55 of the primary shaft 51), of the third speed (third toothed wheel 63 of the first secondary shaft 52 and third pinion 56 of the primary shaft 51) and of the fourth speed (fourth toothed wheel 64 of the second secondary shaft 53 and fourth pinion 57 of the primary shaft 51), with a transmission ratio decreasing from the first to the fourth speed due to the different diameters of the respective toothed wheels 61, 62, 63 and 64 of the two secondary shafts 52, 53 and of the pinions 54, 55, 56, and 57 of the primary shaft 51 (FIG. 13B).

It is to be meant that, when they are not engaged, the toothed wheels 61, 62, 63 and 64 rotate dragged by the pinions 54, 55, 56, and 57 without transmitting the motion to their own secondary shafts 52, 53.

To this regard, respective first sliding coupling 65 and second sliding coupling 66 act on each secondary shaft 52, 53, the couplings being controlled in axial translation with respect to the secondary shafts 52, 53 by a corresponding first coupling fork 67 and second coupling fork 68.

The sliding couplings 65, 66 are wheels which have, on their own respective inner crown placed around the respective secondary shaft 52, 53, a first spline coupling 131 and a second spline coupling 132 (FIG. 14C), respectively, in engagement with corresponding splines formed on the respective secondary shaft 52, 53. It is to be meant that said sliding couplings 65, 66 are free to rotate with respect to their coupling forks 67, 68.

The coupling forks 67, 68 are equipped with a cam transferring end 69 which are manoeuvred by means of a single desmodromic drum 70 having a cylindrical surface 79 whereon one single desmodromic track 19 is formed.

The first sliding coupling 65 has first coupling pins 133 and second coupling pins 134 on the opposite sides thereof, projecting in axial direction respectively in the direction of the first toothed wheel 61 and the third toothed wheel 63.

Analogously, the second sliding coupling 66 has third coupling pins 135 and fourth coupling pins 136 on the opposite sides thereof, projecting in axial direction respectively in the direction of the second toothed wheel 62 and of the fourth toothed wheel 64.

With the axial sliding motion of the respective sliding couplings 65, 66 the pins 133, 134, 135 and 136 are intended to engage in the toothed wheels 61, 62, 63 and 64 thereto they are facing, the latter wheels having first coupling recesses 137, second coupling recesses 138, third coupling recesses 139 and fourth coupling recesses 140, respectively.

According to the herein described operation principle, the cam follower ends 69 of the coupling forks 67, 68 are constrained to follow the path defined by the track 19 implemented in the desmodromic drum 70, during the rotation thereof. Therefore, the coupling forks 67, 68 are equipped with a respective cam follower end 69 manoeuvred by means of said desmodromic drum 70 having a cylindrical surface 79 whereon a single desmodromic track 19 is formed.

The actuation of the desmodromic drum 70, which rotates by an angular amount varying depending upon the gearwheel to be selected, leads to a translation in axial direction of the forks 67, 68.

Each one of the two forks 67, 68 is connected to a selector element 65, 66, one per each secondary shaft of the gearbox which in turn is keyed to its own shaft by means of a grooved profile 131, 132. The adoption of a coupling with grooved profile allows to transmit the rotary motion and at the same time it allows the translation in axial direction of the selector element.

Each selector element on each face is equipped with projections, in particular four, suitably shaped to insert in corresponding recesses, suitably implemented on the toothed wheels assembled on the two secondary shafts of the gearbox, divided as follows: I and III speed on one shaft, II and IV on another one.

Each time, depending upon the selected gearwheel, the selector element will move on one side or on another one. Upon each gearwheel shift, both selector elements will move by engaging or disengaging the responsible gearwheel.

For example, in the speed passage from the $1^{st}$ to the $II^{nd}$ ratio, the selector element 65 placed on the first one of the two secondary shafts of the gearbox will move from the engagement position to the neutral one, at the same time the selector element 66 assembled on the second secondary shaft of the gearbox will move from the neutral position to the engagement position, by keying the toothed wheel 62 related to the $II^{nd}$ speed to its own secondary shaft, that is the projections of the selector element will enter the recesses implemented on the toothed wheel of the $II^{nd}$ speed.

Since, as said, the actuation of the selectors is contemporary and specular, it is possible to implement a desmodromic drum equipped with one single track capable of actuating all four speeds. All this to the advantage of the simplicity of the layout of the solution and of the implementation inexpensiveness.

It is to be noted that the coupling forks 67, 68 are identical between them and with symmetrical sides, they are rotated one with respect the other one by 180°, with a greater construction simplicity. Even the sliding couplings 65, 66 are equal therebetween.

The profile of the desmodromic track 19 is represented in FIG. 14B: S1 designates the representation of the track 19 from the point of view of the first coupling fork 67 acting on the first secondary shaft 52, and S2 designates the representation of the track 19 from the point of view of the second coupling fork 68 acting on the second secondary shaft 53.

C1 and C2, respectively, designate the cams' profiles which will be described hereinafter with greater details, controlling the clutch lever 47 and the control lever 20, respectively.

1a, 2a, 3a and 4a designate the gearwheel engagement from the first one to the fourth one, F designates an idle status, wherein the transmission of the motion from the driven pulley 17 to the primary shaft 51 does not occur, through the synchronizing device 40 (FIG. 14B).

The track paths 51 and S2 are formed, in the present embodiment, from one single peripheral track 19 which is divided into fourth tracts, each one with a width of 90°.

It then comprises two central opposite tracts, which follow a neutral periphery, and two opposite tracts staggered therebetween and with respect to the two central tracts, still with a peripheral course. Such tracts are connected therebetween by respective ramps.

In particular, each ramp comprises an ascending tract, a linear tract extending from a maximum point of the ascending tract, and a descending tract extending from the linear tract, wherein the ascending tract, the linear tract and the descending tract define a substantially trapezoidal profile.

From the tracks 51 and S2 the translations of the sliding couplings 65, 66 with respect to the respective secondary shafts 52, 53, determining the gearwheel engagement, are deduced. The engagement of each gearwheel is alternated by an idle status.

By referring to FIG. 14B, the first sliding coupling 65 and the respective first coupling fork 67 are translated axially when the corresponding cam follower end 69 moves in the staggered tracts of the track 19 which moves it in the direction of the first and the third toothed wheel 61, 63. On the contrary, when this cam follower end 69 is in the central tracts the first secondary shaft 52 does not transmit the motion.

Analogously, when the second sliding coupling 66 and the respective second coupling fork 68 are translated axially, the corresponding cam follower end 69 moves in the staggered tracts of the track 19 which moves it in the direction of the second and the fourth toothed wheel 62, 64. When this cam follower end 69, instead, is in the central tracts, the second secondary shaft 53 does not transmit the motion.

In this example, the cam follower ends 69 of the coupling forks 67, 68 are spaced apart by an arc of 90° on the desmodromic drum.

It is to be noted that the hub shaft 75, the two secondary shafts 52, 53 and the primary shaft 51 have axes parallel therebetween, grouped at the rear wheel 105.

Even the rotation axis of the desmodromic drum 70 is parallel to the axes of the previously mentioned shafts.

As it will be described in more details hereinafter it is actuated by an actuator 80 which will be described hereinafter.

The used gearbox scheme provides some possible variants which will be described by referring to figure (see FIG. 14A).

Scheme A: four ratios with constant delta revolution ratio scale. It is the simplest and most compact solution: it provides two pairs of identical gearwheels between first secondary shaft and second secondary shaft, with two sliding couplings and coupling forks identical therebetween and one single track for defining the speeds on the desmodromic drum. Scheme B: it is the solution shown in relation to the herein described embodiment, it provides four ratios with progressive delta revolution ratio scale. The solution provides an identical pair of (first and second) gearwheels between first secondary shaft and second secondary shaft; two sliding couplings and two coupling forks identical therebetween and one single track for defining the speeds on the desmodromic drum.

Scheme C: solution with four ratios with constant delta revolutions and double clutch: this possible variant provides the use of a double clutch for shifting gearwheel, which can be useful for passing between gearwheels without torque holes from one gearwheel to the other one. It provides due sliding couplings and two coupling forks identical therebetween and two distinct tracks implemented on the cylindrical surface of one single desmodromic drum.

Schema D: solution with six progressive delta revolution ratios. This variant provides the adoption of six speeds. The same scheme can be proposed with constant or progressive delta revolution ratios.

As it clearly results from the scheme of actuations, due to the effect of the previously described geometry the two tracks of the secondary shafts (51 and S2) result to be identical but staggered by 90°, this thanks to the used gearbox scheme. Therefore, by positioning the two coupling forks 67, 68 on a desmodromic track 19 staggered by 90° of the desmodromic drum 70, the possibility is obtained of having the two coupling forks 67, 68 equal therebetween and one single track on the desmodromic drum 70, with a higher constructive convenience.

The electromechanical actuator 80 has the purpose of defining, for each gearwheel shifting procedure, the opening of the rear clutch by means of the dedicated clutch lever 47, the movement of the two coupling forks 67, 68, by disengaging the ongoing gearwheel and by engaging the subsequent or the previous one, the re-closing of the clutch 40. Moreover, the actuator 80 is arranged to actuate the control lever 20 of the front centrifugal clutch 5 in the first speed. In this way, by using one single rotating electric engine, all these procedures are synchronized.

The electromechanical actuator 80 comprises a rotating electric motor 81, suitably fed by means of a control unit in order to make the motor axis to rotate according to both rotation directions. It is to be noted that the rotation axis of the electric motor is perpendicular to the axes of the primary 51, secondary 52 and 53 and hub 75 shafts.

On the rotative output of the electric motor 81 a pair of gearwheels 82, 83 is provided for reducing the transmission ratio outgoing from the motor, gearwheels with parallel axes, controlling a first actuator shaft 84 by means of an engagement of irreversible type allowing a greater precision and less influence of the clearances. The opposite ends of the actuator shaft 84 are supported by first actuator bearings 95. The axis of the first actuator shaft 84, too, is perpendicular to the axes of the primary 51, secondary 52 and 53 and hub 75 shafts, and this allows a reduction in the overall dimensions.

The first actuator shaft 84 is engaged to an actuator pinion 96 which controls, with a suitable reduction ratio, a second actuator shaft 85 perpendicular to the previous one and then it is parallel to the axes of the primary 51, secondary 52 and 53 and hub 75 shafts.

It extends on both sides of the actuator pinion 96 to control both the previously described desmodromic drum 70 and a cam set which actuates the clutch 47 and control 20 levers, with a pair of second actuator bearings 97 arranged on the side of the cam set.

The desmodromic drum 70 is on the side of the transmission 1 corresponding to the internal combustion engine and to the rear wheel; said cam system, together with said levers 20, 47, is on the side of the transmission 1 covered by the cover 110, wherein there is the synchronizer device 40 too.

The desmodromic drum 70 is controlled by a first actuator toothed wheel 98 which is keyed directly on the second actuator shaft 85; it is engaged to a second actuator toothed wheel 58 positioned between the actuator 80 and the gearbox 50, which controls directly in rotation a third actuator shaft 59 fastened to the base of the desmodromic drum 80 which thus is suitably rotated.

In the present example, the transmission ratio between the second and the third actuator shaft 85, 59 is 1:1, thus a rotation angle of 90° of the desmodromic drum 70, and then then a gearwheel shifting (FIG. 14B), corresponds to a rotation angle of the first (or the second) actuator wheel 98 of 90°. This in case of a four-speed gearbox.

Therefore, the engagement of a precise gearwheel corresponds to each position of the first actuator toothed wheel 98 staggered by 90°. To this regard, then, it is possible to provide a feedback signal indicating the engaged gearwheel, determined by the rotation of the actuator 80.

Therefore, the first actuator toothed wheel 98 comprises a plurality of magnets 119 N and S, in particular four magnets (two per polarity) arranged alternated and spaced apart on a single periphery of an arc of 90°.

It is to be meant that, in a three-speed solution, three magnets could be sufficient.

The magnets 119 N and S are arranged on the side of the wheel 98 wherein it is connected to the second actuator shaft 85.

On this side, inside an actuator casing 99 extending for the whole extension of the second actuator shaft 85, there is a detection card 120 which comprises a pair of Hall sensors 121, arranged on a periphery corresponding to that of the magnets 119, and separated by an arc of 90°.

Figure 18:
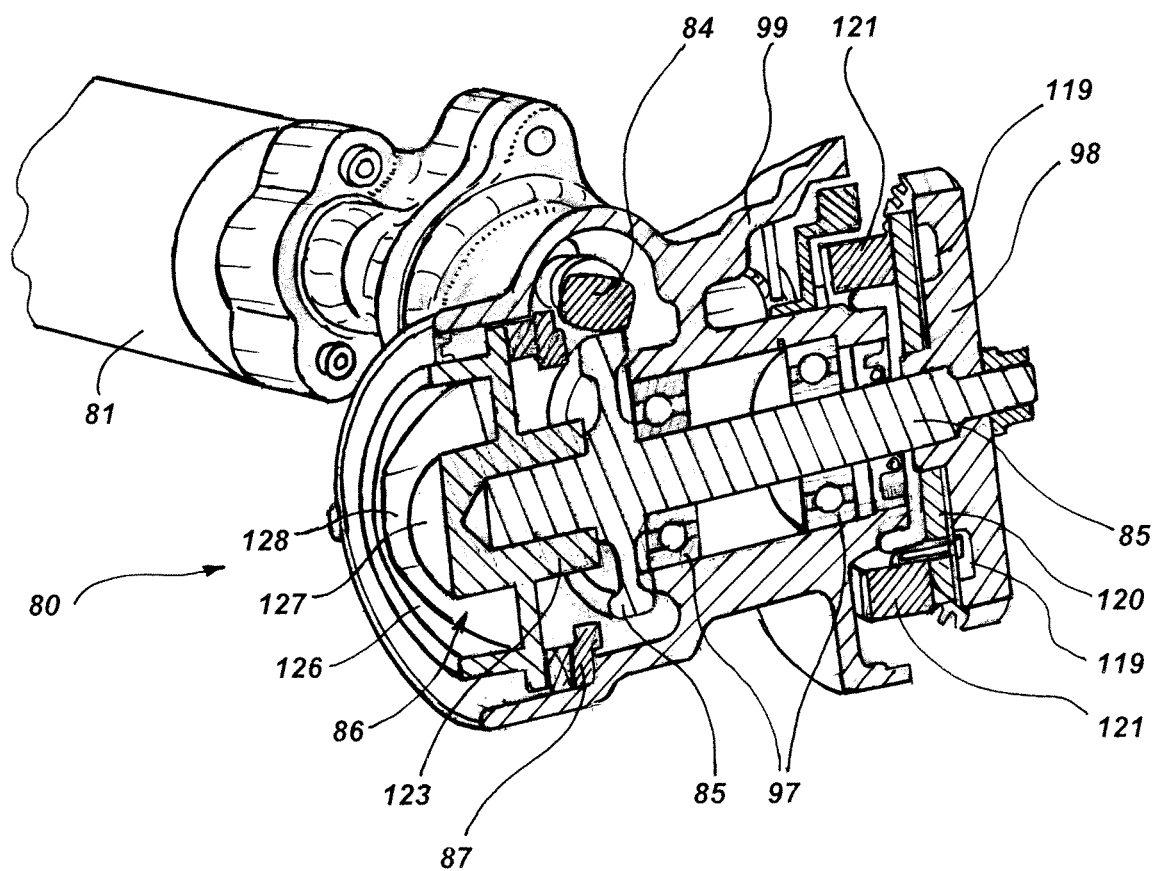
FIG. 18 shows a second perspective section view of the sixth detail of FIG. 16.
Figure 21:
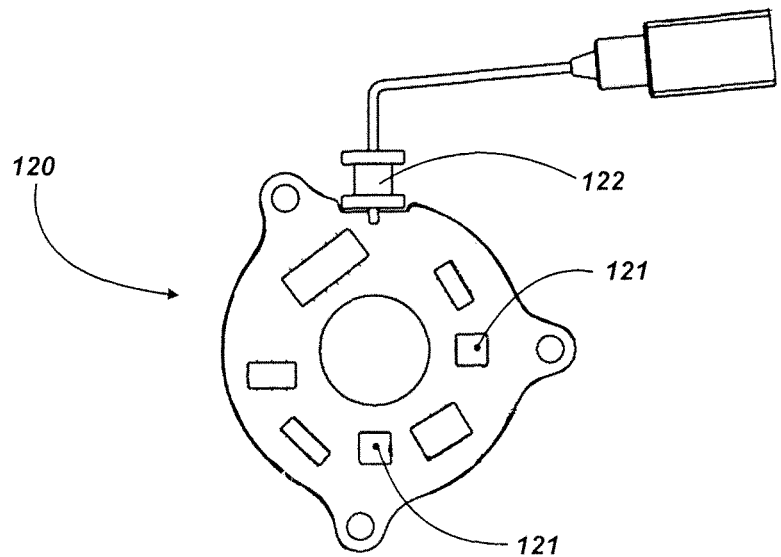
FIG. 21 shows a schematic view of an additional component of the sixth detail of FIG. 16.
Figure 22:
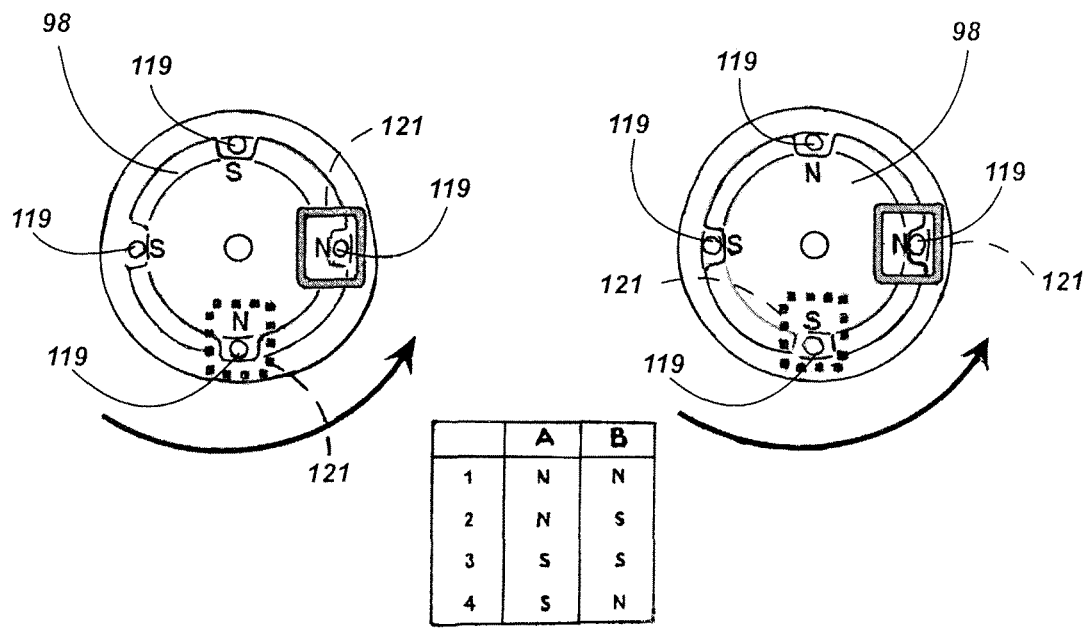
FIG. 22 illustrates the operation of said sixth detail of FIG. 16 in relation to the component of FIG. 21.

The actuator casing 99 (FIG. 18) is integral to the container of the transmission 109, as well as the card 120, which is connected to a control unit, which receives said feedback signal, by means of a connector 122 (FIG. 22). The card 120 comprises even other chips which carry out other functions assigned thereto.

The Hall sensors 121 are capable of detecting the polarities of the magnets of the first actuator toothed wheel 85, as each one thereof produces a peak signal with different polarity according to the polarity of the magnet 119 which passes nearby. By translating the signal which corresponds to N with 0 and the signal which corresponds to S with 1 (or viceversa), the pair of sensors 121 provides a binary signal according to the table of FIG. 22 (N-N; N-S; S-S, S-N) which as a whole can assume four distinct values, each one thereof will correspond to a speed.

In this way, which is wholly passive and it depends only upon the rotation of the cam actuator of a synchronizer, it is possible generating a signal representing the engaged gearwheel, which could be used for any purpose, in particular it could provide an indication of the really engaged gearwheel to one or more control units.

On the other side of the actuator pinion 84, on the end of the second actuator shaft 85 there is a cam set 86 which comprises a first cam 87 formed on the periphery of a first cam disc 88 arranged adjacent to the actuator pinion 84.

The first cam 87 is fixed bot radially and axially, that is it is immobile with respect to the actuator casing 99 thereto it is constrained.

The cam profile of such first cam 87 has four peaks and four valleys, each one spaced apart by 90°, the valleys corresponding to a respective speed from the first to the fourth, thereto the magnets 119 of the first actuator toothed wheel 98 will equally correspond; the peaks, as it will be seen shortly, instead, correspond to the idle positions F (FIG. 14B).

The cam set 86 further comprises a cam follower 89 having a cam follower bushing 123 put on the top of the second actuator shaft 85, which is constrained thereto from the rotational point of view, but it is axially mobile therealong thanks to one or more not represented axial ribs, which form a prismatic pair.

The cam follower 89 further comprises a second cam disc 126 having two opposite faces, one faced towards the first cam 87 and having a cam profile analogous to the one of the first cam 87, but it is specular, that is it has four peaks and four valleys each one spaced apart by 90°, the valleys corresponding to a respective speed from the first one to the fourth one, thereto the magnets 119 of the first actuator toothed wheel 98 will equally correspond; the peaks, as it will be seen shortly, instead correspond to the idle positions F (FIG. 14B).

Therefore, the cam follower 89 moves away from the actuator pinion 84 when it is necessary to obtain an idle status F by pressing at the same time the second actuation button 48 of the input clutch 40, to interrupt the transmission of the motion from the driven pulley 17 to the primary shaft 51, and by acting on the sliding couplings 65, 66 of the gearbox 50 through the rotation of the desmodromic drum 70.

Analogously, the cam follower 89 approaches to the actuator pinion 84 when any gearwheel is engaged, that is when the second actuation button 48 has not to be pressed to allow the transmission of the motion from the driven pulley 17 to the primary shaft 51.

In order to obtain this approaching or return it will be necessary to arrange a return mechanism of conventional type, for example on the clutch lever 47.

In order to obtain said pressure on the second actuation button 48, on the face of the second cam disc 126 opposite to the profile of the cam follower it has an actuating projection 127 which represents an extension of the second actuator shaft 85 but which is mobile with alternated motion in response to the interaction between first cam 87 and cam follower 89.

The actuating projection 127 acts directly on an actuation end 125 of the clutch lever 47, opposite to the second pressing end 28, by obtaining the oscillation of the clutch lever 47 upon each gearwheel shifting, to determine the idle status F and the gearwheel shifting driven through the desmodromic drum 70.

This oscillation is represented by the track C1 in FIG. 14B.

Moreover, on the face of the second cam disc 126 opposite to the profile of the cam follower the second cam disc 126 has an additional cam profile determining a second cam 128 on such face. Such profile has a projection corresponding to the engagement of the first gearwheel and it acts on an actuation end 124 of the control lever 20 opposite to the first pressing end 24, by obtaining the oscillation of the control lever 20 which then could act on the first actuation button 16, acting as actuation button too, which allows the effective detachment of the centrifugal clutch 5 on the crankshaft 2, but only in the first speed, as previously described.

This oscillation is represented by the track C2 in FIG. 14B.

By referring to FIGS. 25 to 30, a second embodiment of the transmission according to the invention is herein disclosed, wherein identical or analogous features are indicated by the same reference numerals used in connection with the first embodiment.

Figure 25:
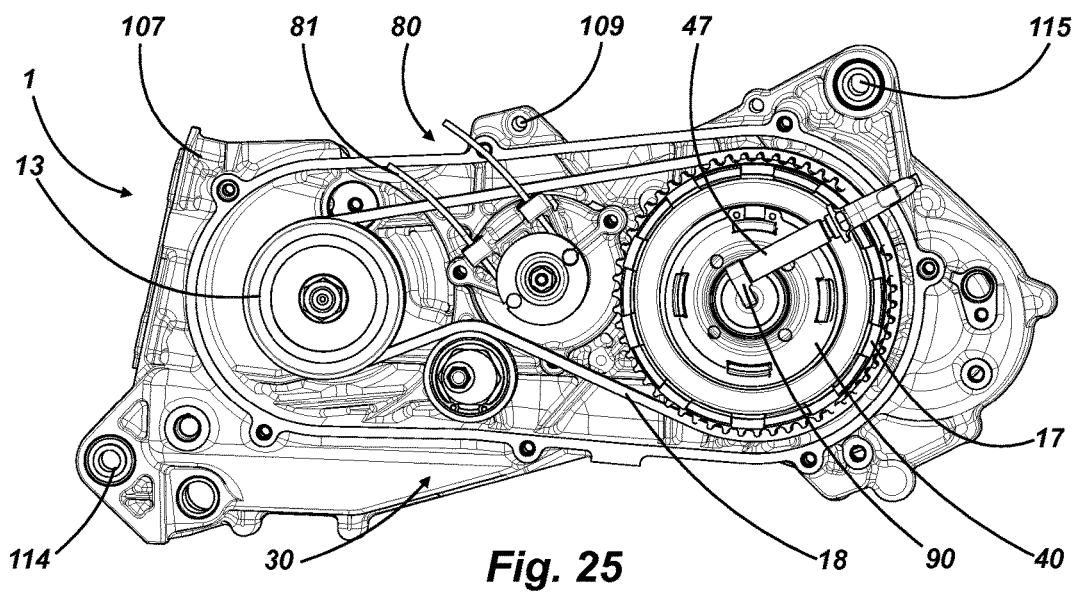
FIG. 25 shows a front view of a second embodiment of high performance synchronous transmission according to the present invention, without outer casing.
Figures 26A, 26B:
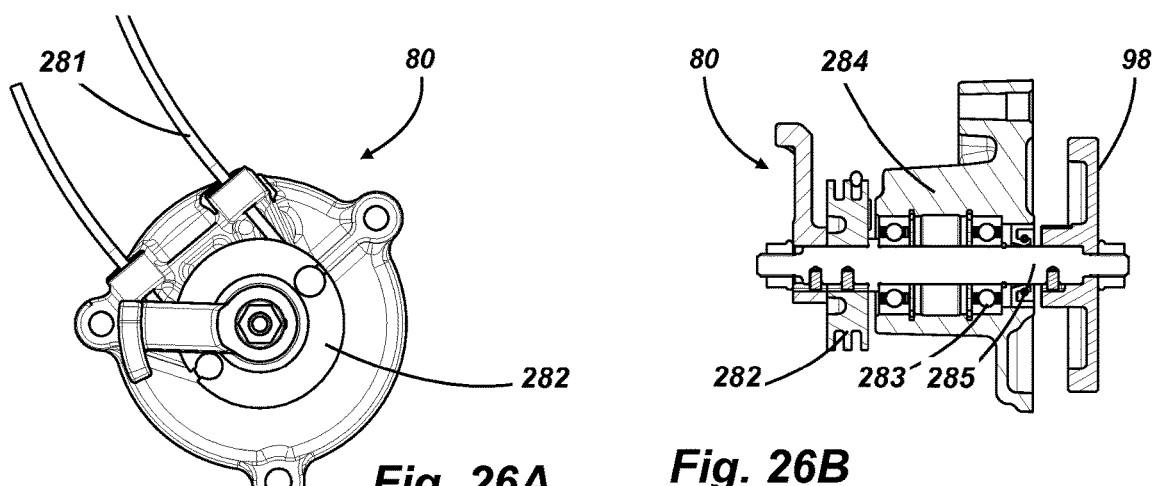
FIG. 26A shows a front view of an alternative sixth detail of the transmission of FIG. 25.
FIG. 26B shows a longitudinal top plan section view of the alternative sixth detail of FIG. 26A.
Figures 26C, 26D:
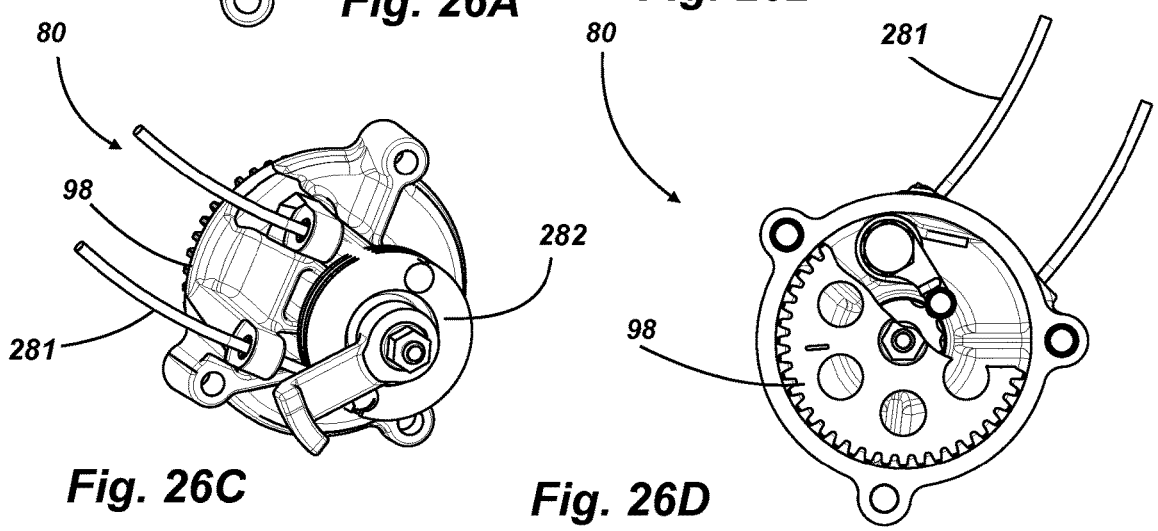
FIG. 26C shows a perspective view of the alternative sixth detail of FIG. 26A.
FIG. 26D shows a a transverse section view of the alternative sixth detail of FIG. 26A.
Figure 27:
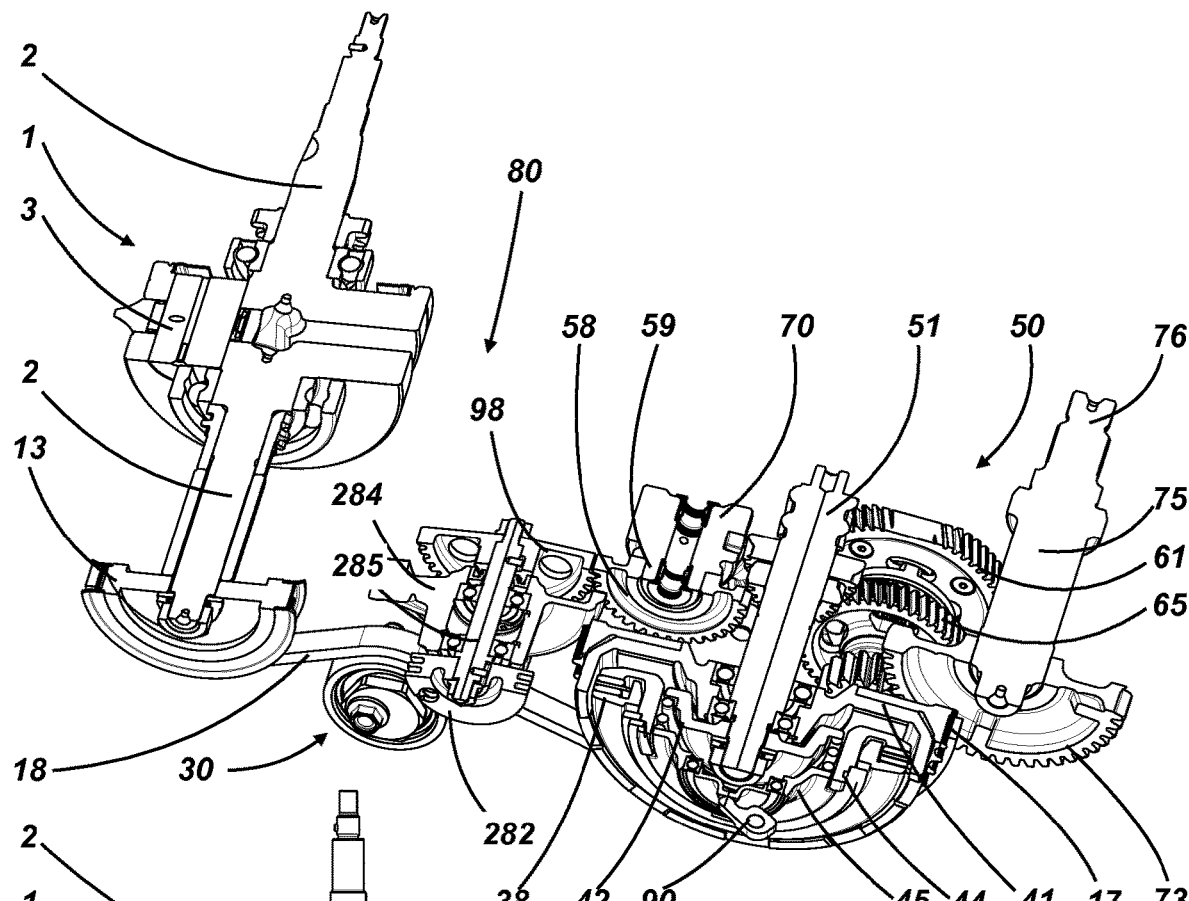
FIG. 27 shows a perspective top view and a view in flat longitudinal section of the transmission of FIG. 25.
Figure 28:
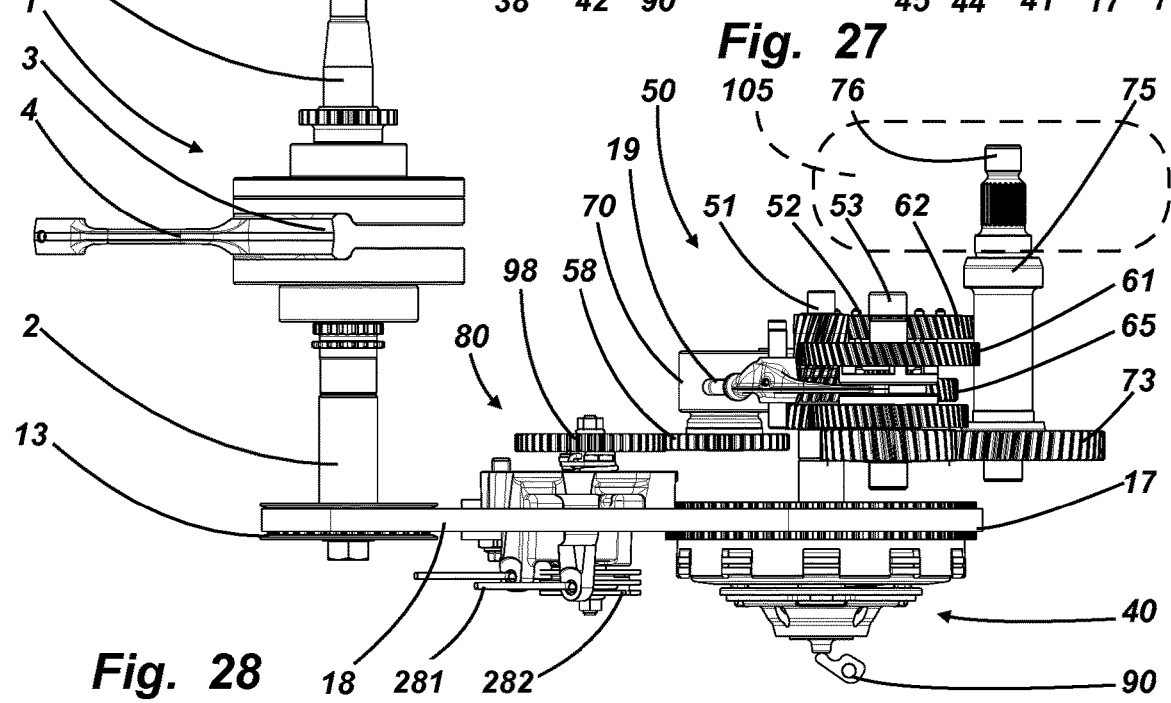
FIG. 28 shows a top plan view of the transmission of FIG. 25.
Figure 29:
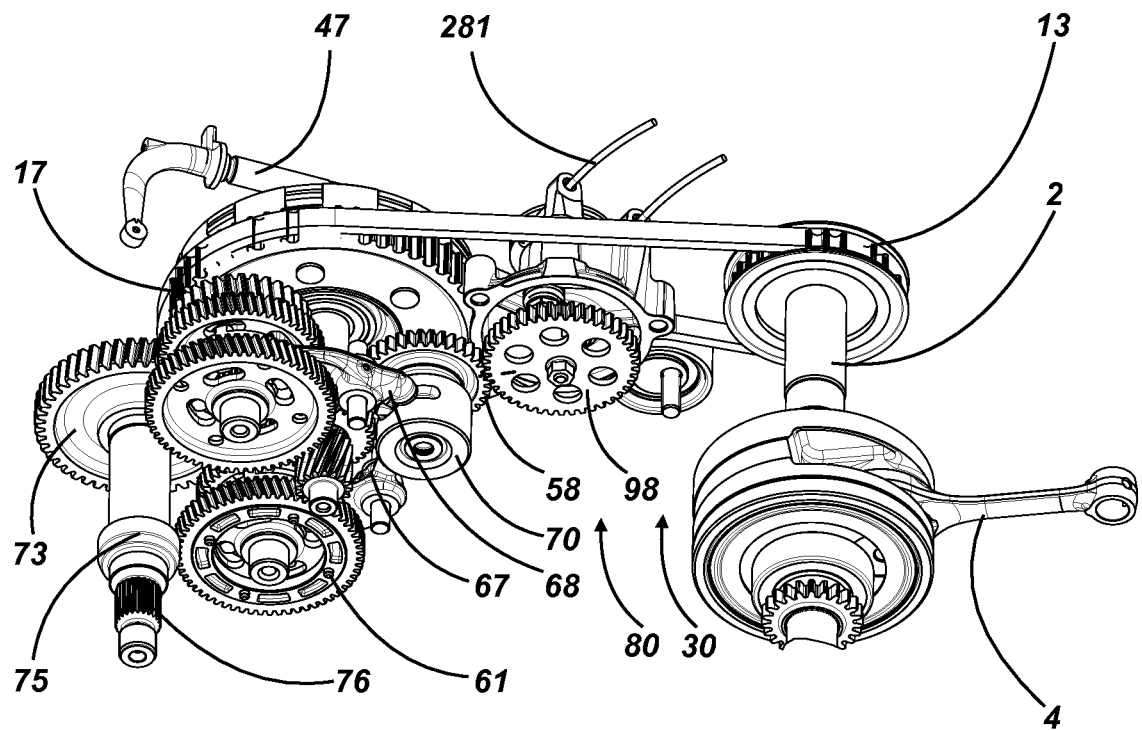
FIG. 29 shows a rear perspective view of the transmission of FIG. 25.

The transmission 1 of FIG. 25 is intended to be operated by a command given by the driver or by a separated servomechanism provided to select different speeds according to a programmed logic. In this connection, any kind of centrifugal clutch on the crankshaft is absent.

The transmission 1 comprises a crankshaft 2 comprising a crank 3 thereto a connecting rod 4 is connected which receives the motion by a not represented piston; however, it is to be meant that such transmission could be applied even to several-cylinder engines.

Again, the crankshaft 2 extends from both sides of the crank: in the direction opposite to the transmission the crankshaft will be connected, by way of example, to an electric engine-generator, in case but not exclusively for an operation of hybrid type, and to a cooling valve.

A driving pulley 13 is arranged at the distal end of the crankshaft 2, to transmit the motion from the crankshaft 2 to the axis of a driven pulley 17 which constitutes the input of the real gearbox.

The two driving 13 and driven 17 pulleys are toothed and they are connected by a synchronous belt 18 with a fixed transmission ratio. The side containments of the belt 18 are mounted on this driving pulley 13 in order to optimize the transmission performance to implement a synchronous connection.

This belt 18 is required for transmitting the motion from the axis of the crankshaft 2 to the axis of the gearbox input, placed in the area of the rear wheel 105.

The synchronous belt 18 requires the presence of a fixed tensioner 30, arranged in the lower branch of the belt 18 (FIG. 27) as disclosed in connection with the first embodiment.

The transmission ratio is fixed and the tensioner 30 has to keep a constant load under all use conditions.

As already highlighted, it is to be noted that it is not strictly necessary that the belt 18 has to be toothed, as there are so-called high transmission performance belts, that is substantially synchronous or almost synchronous, with or without tensioning device 30.

The driven pulley 17 is a toothed pulley too, or of other type depending upon the selected belt. It transmits the motion from the belt 18 to an input clutch 40 (FIG. 28) which performs materially the speed shifts.

The input clutch 40 is a clutch of the disc type as disclosed in connection with the first embodiment, and it comprises a second clutch housing 41 connected to the driven pulley 17. The input clutch 40 transmits the motion to a primary shaft 51 of the gearbox 51 the distal end thereof, facing towards the cover 110 of the transmission 1, is connected to a clutch hub 42.

Inside the housing 41 two clutch discs of the input clutch 40 are included: a more external first clutch disc 38 is connected to the housing 41, whereas a second clutch disc 39 is faced thereto more internally. It is connected and integral to an inner disc-pushing element 44, which surrounds and includes the clutch hub 42 thereto it is connected. The inner disc-pushing element acts axially on the clutch discs 38, 39 by opening and closing them.

Figure 30:
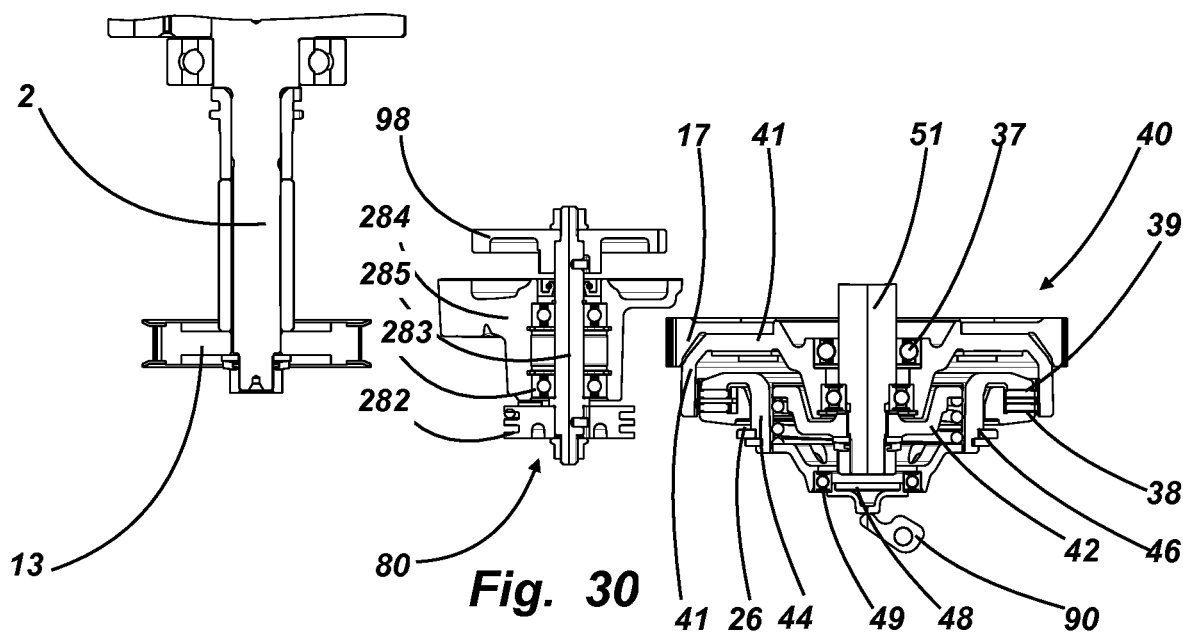
FIG. 30 shows a top plan view in flat longitudinal section of the transmission of FIG. 25.

A clutch cover 26 is connected to the first clutch disc 38, which cover encloses the space included in the second clutch housing 41 and supports the disc-pushing elements which will be described hereinafter (FIG. 30).

To this regard, a clutch spring 46 is positioned between the clutch hub 42 and an inner disc-pushing element 45 covering and towering above the clutch hub 42. At the distal end of the primary shaft 51, thus at the rotation centre thereof, the outer disc-pushing element 45 comprises a second actuation button 48 assembled on a second clutch bearing 49 which releases it from the rotation of the outer disc-pushing element 45.

Onto the second actuation button 48 a pressure can be exerted which determines the detachment of the input clutch 40.

The clutch discs 38, 39, usually, are closed due to the effect of the load of the clutch spring 46. The motion is then transmitted by the driven pulley 17 to the housing 41 and to the discs 38, 39, and therefrom to the two disc-pushing elements 44, 45 and to the clutch hub, and then to the primary shaft 51.

When a pressure is exerted on the second actuation button 48, this pushes towards the distal end of the primary shaft 51 the outer disc-pushing element 45: through the inner disc-pushing element the second clutch disc 39 is moved away from the first clutch disc 38, thus by interrupting the kinematic continuity between second clutch housing 41 and clutch hub 42.

The pressure on the actuating button is obtained by means of a clutch lever 47 (FIG. 25) exerting a pressure through a pressing operating end, pressure which opposes to the load of the clutch spring 46 which defines the dragging load of the clutch 40.

It is understood that the clutch lever of the present embodiment is operated by a servomechanism controlled by the driver or according to a programmed logic leading the transmission operation.

The input clutch 40 is arranged for driving a mechanical gearwheel transmission 50, the number of ratios thereof is not constraining. In the scheme which will be described hereinafter four ratios are provided.

The used gearbox scheme provides a primary axis and two secondary axes, and a final hub shaft, that is the wheel axis. This scheme can be the most suitable one for the type applying to a scooter, due to compactness in axial direction and versatility in managing ratios. The gearbox 50, as in the first embodiment, then comprises: a primary shaft 51, already mentioned with reference to the input clutch 40 which transmits to it the motion, with an input gearwheel 60 which is connected to the clutch hub 42; a first secondary shaft 52 which is assigned to the first and third speed by means of a first running toothed wheel 61 and a third running toothed wheel 63 with different diameters, with a respective first output gearwheel 71 for engaging with the hub shaft 75 connected to the rear driving wheel 105; a second secondary shaft 53, intended to the second and fourth speed with a second running toothed wheel 62 and a fourth running toothed wheel 64, with output gearwheel 72 for engaging with the hub shaft 75 connected to the rear driving wheel 105; and at last the already mentioned hub shaft 75 which supports an output toothed wheel 73 with big diameter, so as to implement an additional reduction in the transmission ratio at the hub shaft 75.

The above-mentioned toothed wheels 61, 62, 63 and 64 of the first, second, third and fourth speed, respectively, are assembled freely on the respective secondary shaft 52, 53 so that they can rotate with respect thereto, by remaining in a fixed and predetermined axial position, and they are respectively engaged with a first running pinion 54, a second running pinion 55, a third running pinion 56 and a fourth running pinion 57 arranged fixed and integral to the primary shaft 51, for transmitting the first speed (first toothed wheel 61 of the first secondary shaft 52 and first pinion 54 of the primary shaft 51), of the second speed (second toothed wheel 62 of the second secondary shaft 53 and second pinion 55 of the primary shaft 51), of the third speed (third toothed wheel 63 of the first secondary shaft 52 and third pinion 56 of the primary shaft 51) and of the fourth speed (fourth toothed wheel 64 of the second secondary shaft 53 and fourth pinion 57 of the primary shaft 51), with a transmission ratio decreasing from the first to the fourth speed due to the different diameters of the respective toothed wheels 61, 62, 63 and 64 of the two secondary shafts 52, 53 and of the pinions 54, 55, 56, and 57 of the primary shaft 51.

It is to be meant that, when they are not engaged, the toothed wheels 61, 62, 63 and 64 rotate dragged by the pinions 54, 55, 56, and 57 without transmitting the motion to their own secondary shafts 52, 53.

To this regard, respective first sliding coupling 65 and second sliding coupling 66 act on each secondary shaft 52, 53, the couplings being controlled in axial translation with respect to the secondary shafts 52, 53 by a corresponding first coupling fork 67 and second coupling fork 68.

The coupling forks 67, 68 are manoeuvred by means of a single desmodromic drum 70 having a cylindrical surface 79 whereon one single desmodromic track 19 is formed, so that the coupling forks 67, 68 are constrained to follow the path defined by the track 19 implemented in the desmodromic drum 70, during the rotation thereof. Therefore, the coupling forks 67, 68 are equipped with a respective cam follower end manoeuvred by means of said desmodromic drum 70 having a cylindrical surface 79 whereon a single desmodromic track 19 is formed.

The actuation of the desmodromic drum 70, which rotates by an angular amount varying depending upon the gearwheel to be selected, leads to a translation in axial direction of the forks 67, 68.

Each one of the two forks 67, 68 is connected to a selector element 65, 66, one per each secondary shaft of the gearbox which in turn is keyed to its own shaft by means of a grooved profile 131, 132. The adoption of a coupling with grooved profile allows to transmit the rotary motion and at the same time it allows the translation in axial direction of the selector element.

As disclosed with reference to the first embodiment of the transmission according to the present invention, each selector element on each face is equipped with projections, in particular four, suitably shaped to insert in corresponding recesses, suitably implemented on the toothed wheels assembled on the two secondary shafts of the gearbox, divided as follows: I and III speed on one shaft, II and IV on another one.

Each time, depending upon the selected gearwheel, the selector element will move on one side or on another one. Upon each gearwheel shift, both selector elements will move by engaging or disengaging the responsible gearwheel.

For example, in the speed passage from the $1^{st}$ to the $II^{nd}$ ratio, the selector element 65 placed on the first one of the two secondary shafts of the gearbox will move from the engagement position to the neutral one, at the same time the selector element 66 assembled on the second secondary shaft of the gearbox will move from the neutral position to the engagement position, by keying the toothed wheel 62 related to the $II^{nd}$ speed to its own secondary shaft, that is the projections of the selector element will enter the recesses implemented on the toothed wheel of the $II^{nd}$ speed.

Since, as said, the actuation of the selectors is contemporary and specular, it is possible to implement a desmodromic drum equipped with one single track capable of actuating all four speeds. All this to the advantage of the simplicity of the layout of the solution and of the implementation inexpensiveness.

It is to be noted that the coupling forks 67, 68 are identical between them and with symmetrical sides, they are rotated one with respect the other one by 180°, with a greater construction simplicity. Even the sliding couplings 65, 66 are equal therebetween.

The electromechanical actuator 80 has the purpose of defining, for each gearwheel shifting procedure, the movement of the two coupling forks 67, 68, by disengaging the ongoing gearwheel and by engaging the subsequent or the previous one, the re-closing of the clutch 40.

The electromechanical actuator 80 comprises a rotating electric motor which is not part of the transmission but it is assembled to the chassis of the motorcycle 100, and conveniently controlled by a suitably control unit.

The electric motor drives, by means of a pulleys control, a wire 281, a pivot wheel 282 rotating an actuator axle 285 mounted on respective actuator bearings 83, which are mounted inside a tubular cavity formed in an actuator housing 284, integral to the transmission cover 110.

The pulley control is used for its precision, i.e. suitable to rotate forward and back the actuator axle 285 of the angles needed to directly drive the desmodromic drum 70.

The desmodromic drum 70 is located on the side of transmission 1 corresponding to the internal combustion engine and to the rear wheel. The desmodromic drum 70 is driven by a first actuating gearwheel 98 which is directly connected to the actuator shaft 285; it is geared to a second actuating gear wheel 58 positioned between the actuator 80 and the gearbox 50, which directly controls rotation an additional (third) actuator shaft 59 secured to the base of the desmodromic drum 70 which is thus appropriately rotated.

In the present embodiment, the transmission ratio between the actuator axle 285 and said additional actuator shafts 59 is 1:1, so that at a rotation angle of the first (or second) actuator wheel 98 of 90° corresponds to a rotation angle 90° of the desmodromic drum 70.

Therefore, each position of the first actuating gearwheel 98 offset by 90° corresponds to the insertion of a precise speed ratio. To this purpose, it is possible to provide an indicative feedback signal of the engagement gear, determined by rotation of the actuator 80.

Therefore, the first actuator toothed wheel 98 is equipped with magnets as disclosed in connection with the first embodiment of the transmission according to the invention, and it hence faces a detection board having Hall sensors.

To the above-described synchronous transmissions a person skilled in the art, in order to satisfy additional and contingent needs, could introduce several additional modifications and variants, all however comprised within the protection scope of the present invention, as defined by the enclosed claims.

The invention claimed is:

1. A high performance synchronous transmission to be used aboard a motorcycle for transmitting the motion generated by an engine to a driving wheel, between a crankshaft and a hub shaft parallel therebetween and perpendicular to the median plane of the motorcycle, having a primary shaft of mechanical gearbox, and a pair of secondary shafts equipped with one or more secondary gearwheels for transmitting the motion to a hub shaft, wherein a single desmodromic drum provides to actuate a pair of coupling forks which define selectively the position of respective sliding couplings between primary shaft and secondary shafts to select all speeds of the transmission, the desmodromic drum being in phase with a device for actuating the gearwheels, wherein the coupling forks are equipped with a respective cam follower end maneuvered by means of said desmodromic drum having a cylindrical surface whereon a single desmodromic track is formed.

2. The synchronous transmission according to claim 1, wherein one provides:
a first secondary shaft assigned to the first and to the third speed having a first toothed wheel and a third toothed wheel; and
a second secondary shaft assigned to the second and to the fourth speed having a second toothed wheel and a fourth toothed wheel, said toothed wheels, being free to rotate on the respective secondary shafts, and being engaged with a first pinion, a second pinion, a third pinion and a fourth pinion respectively, integral to the primary shaft.

3. The synchronous transmission according to claim 1, wherein the coupling forks are equipped with a respective cam follower end manoeuvred by means of said desmodromic drum having a cylindrical surface whereon at least a desmodromic track is formed.

4. The synchronous transmission according to claim 3, wherein said desmodromic track is single.

5. The synchronous transmission according to anyone of the claim 2, wherein the respective first sliding coupling and second sliding coupling controlled in axial translation with respect to the corresponding secondary shafts, are constituted by wheels which have, on their own respective inner crown put on the respective secondary shaft, a first spline coupling and a second spline coupling, respectively, in engagement with a corresponding spline coupling formed on the respective secondary shaft, the sliding couplings being free to rotate with respect to the coupling forks thereof.

6. The synchronous transmission according to claim 5, wherein the first sliding coupling has first coupling pins and second coupling pins on the opposite sides thereof, projecting in axial direction respectively in the direction of the first toothed wheel and the third toothed wheel; and the second sliding coupling has third coupling pins and fourth coupling pins on the opposite sides thereof, projecting in axial direction respectively in the direction of the second toothed wheel and of the fourth toothed wheel, said pins being intended to engage in the toothed wheels thereto they are facing, these latter wheels having respectively first coupling recesses, second coupling recesses, third coupling recesses and fourth coupling recesses.

7. The synchronous transmission according to claim 4, wherein the desmodromic drum comprises track paths which are formed by one single peripheral track which is divided into four tracts each one with a width of 90°, in particular two central opposite tracts, which follow a neutral periphery, and two opposite tracts staggered therebetween and with respect to the two central tracts, still with a peripheral course, said tracts being connected therebetween by respective ramps, the coupling forks having respective cam follower ends which are spaced apart therebetween by an arc of 90° on the desmodromic drum.

8. The synchronous transmission according to claim 7, wherein there are four ratios with constant delta revolution ratio scale wherein two pairs of toothed wheels are provided identical therebetween between first secondary shaft and second secondary shaft.

9. The synchronous transmission according to claim 7, wherein there are four ratios with progressive delta revolution ratio scale and wherein a pair of identical toothed wheels is provided between first secondary shaft and second secondary shaft.

10. The synchronous transmission according to claim 8, wherein the coupling forks and the respective sliding couplings are identical therebetween and with symmetric sides.

11. The synchronous transmission according to claim 1, wherein the hub shaft, the two secondary shafts and the primary shaft have axes parallel therebetween, grouped at a rear wheel the rotation axis of the desmodromic drum being parallel to said shafts.

12. The synchronous transmission according to claim 1, wherein the actuator device comprises one single bidirectional rotating electric motor.

13. The synchronous transmission according to claim 11, wherein the rotation axis of the electric motor is perpendicular to the axes of the primary, secondary and hub shafts.

14. The synchronous transmission according to claim 13, wherein the electric motor rotates an actuator pinion controlling an actuator shaft with axis parallel to the axes of the primary, secondary and hub shafts.

15. The synchronous transmission according to claim 14, wherein the desmodromic drum is on the side of the transmission which corresponds to the internal combustion engine and to the rear wheel, and it is controlled by an actuator toothed wheel which is keyed directly on the actuator shaft and it is engaged to an additional actuator toothed wheel, positioned between the actuator device and the primary shaft and the pair of secondary shafts, which controls directly in rotation the desmodromic drum-.

16. The synchronous transmission according to claim 15, wherein the transmission ratio between the actuator shaft and the desmodromic drum is 1:1.

17. The synchronous transmission according to claim 16, wherein said actuator toothed wheel comprises four magnets N and S arranged alternated and spaced apart on one single periphery of an arc of 90°, a detection card being provided adjacent to said actuator toothed wheel which comprises a pair of Hall sensors, arranged on a periphery corresponding to that of the magnets, and separated by an arc of 90° so as to produce a binary signal which can assume four distinct values, each one thereof will be correspond to a speed.

18. The synchronous transmission according to claim 1, wherein the desmodromic drum is in phase with an actuator comprising a pulley control with a wire and a pulleys wheel rotating an actuating axle on which is keyed an actuator wheel, arranged to rotate said desmodromic drum.

19. A motorcycle comprising a propulsion unit arranged in a position below a saddle, inside a chassis extending from a front wheel to a rear driving wheel, comprising, between said propulsion unit and said rear wheel a transmission according to claim 1, received in a container closed, on an exposed side of the motorcycle, by a cover.

20. The synchronous transmission according to claim 3, wherein the respective first sliding coupling and second sliding coupling, controlled in axial translation with respect to the corresponding secondary shafts, are constituted by wheels which have, on their own respective inner crown put on the respective secondary shaft, a first spline coupling and a second spline coupling, respectively, in engagement with a corresponding spline coupling formed on the respective secondary shaft, the sliding couplings being free to rotate with respect to the coupling forks thereof.

21. The synchronous transmission according to claim 9, wherein the coupling forks and the respective sliding couplings are identical therebetween and with symmetric sides.

22. The synchronous transmission according to claim 12, wherein the rotation axis of the electric motor is perpendicular to the axes of the primary, secondary and hub shafts.

* * * * *